(12) United States Patent
Oßmer et al.

(10) Patent No.: US 11,136,968 B2
(45) Date of Patent: Oct. 5, 2021

(54) ACTUATOR ASSEMBLY

(71) Applicant: MEMETIS GMBH, Karlsruhe (DE)

(72) Inventors: Hinnerk Oßmer, Stutensee (DE);
Marcel Gültig, Karlsruhe (DE);
Christof Megnin, Speyer (DE)

(73) Assignee: memetis GmbH, Karlsruhe (DE)

( * ) Notice: Subject to any disclaimer, the term of this patent is extended or adjusted under 35 U.S.C. 154(b) by 0 days.

(21) Appl. No.: 16/860,988

(22) Filed: Apr. 28, 2020

(65) Prior Publication Data

US 2020/0347834 A1    Nov. 5, 2020

(30) Foreign Application Priority Data

Apr. 30, 2019    (EP) .................................... 19171912

(51) Int. Cl.
*F03G 7/06*    (2006.01)

(52) U.S. Cl.
CPC .................................. *F03G 7/065* (2013.01)

(58) Field of Classification Search
None
See application file for complete search history.

(56) References Cited

U.S. PATENT DOCUMENTS

| | | | |
|---|---|---|---|
| 4,337,892 A | | 7/1982 | Diermayer et al. |
| 4,553,393 A | * | 11/1985 | Ruoff ........................ F16F 3/04 337/140 |
| 6,355,501 B1 | * | 3/2002 | Fung ........................ H01L 21/84 257/E21.703 |
| 7,372,348 B2 | | 5/2008 | Xu et al. |
| 2010/0213623 A1 | * | 8/2010 | Isshiki ..................... C08L 83/06 257/791 |
| 2017/0097104 A1 | * | 4/2017 | Deperraz ................ F16K 7/045 |
| 2018/0200989 A1 | * | 7/2018 | Meyer ................... H05K 3/4688 |

FOREIGN PATENT DOCUMENTS

| | | |
|---|---|---|
| DE | 31 41 216 A1 | 5/1982 |
| DE | 197 54 747 A1 | 6/1999 |
| DE | 10 2016 219 245 A1 | 4/2018 |
| JP | 2013-015161 A | 1/2013 |
| KR | 2015-0127467 A | 11/2015 |

OTHER PUBLICATIONS

Extended European Search Report, EP 19 171 912.9, dated Feb. 11, 2020, 10 pages.

* cited by examiner

*Primary Examiner* — Shafiq Mian
(74) *Attorney, Agent, or Firm* — Bose McKinney & Evans LLP

(57) ABSTRACT

An inventive actuator assembly has a substrate having a through hole. A circuit path is mounted on a side of the substrate and has a support surface that defines a circuit path through hole. An actuator made at least partially of a shape memory material is included and has first and second ends. The actuator has a through hole at least at the first end. A fastener extends through the actuator through hole, the circuit path through hole and the substrate through hole to permanently fix the substrate, the actuator and the circuit path at the first end of the actuator. The actuator may have through holes on both ends, such that the substrate includes a second substrate through hole and a second circuit path is provided that defines a second circuit path through hole. A second fastener fixes together the second end, the second circuit path and the substrate.

31 Claims, 12 Drawing Sheets

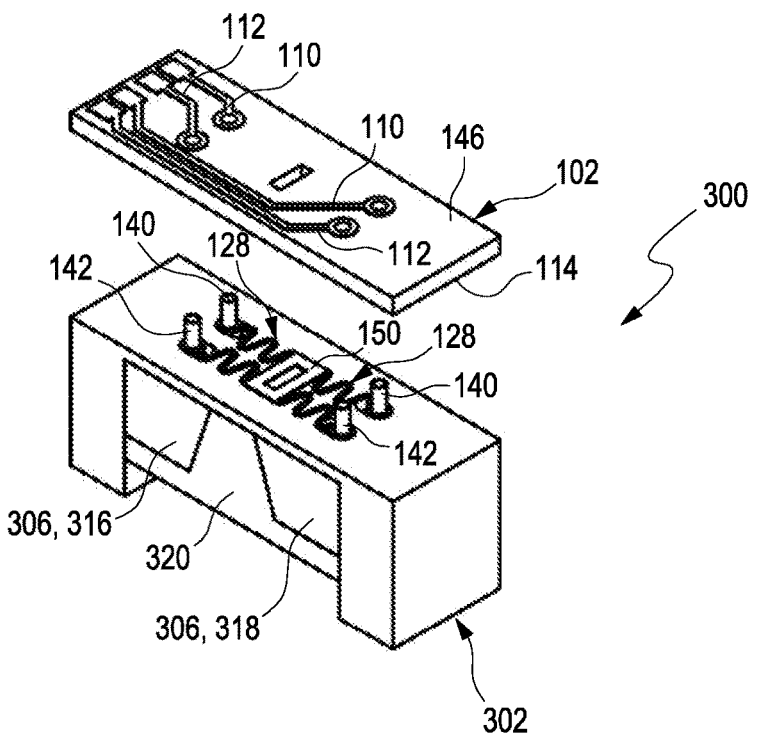
Fig. 6 E
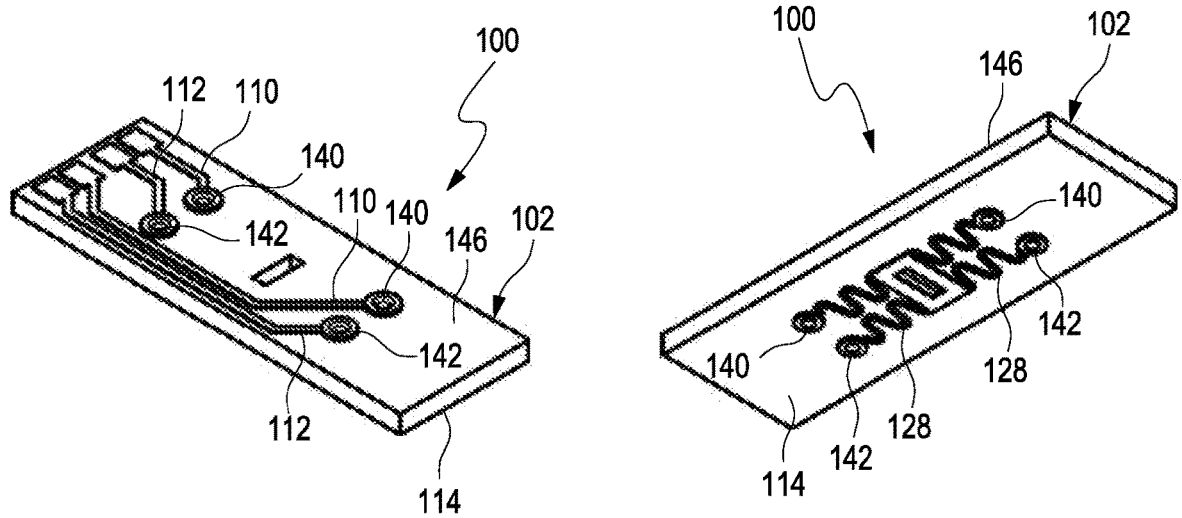
Fig. 6 F
Fig. 6 G

ACTUATOR ASSEMBLY

RELATED APPLICATIONS

This application claims priority to EP 19 171 912.9, filed Apr. 30, 2019, the entire disclosure of which is hereby incorporated herein by reference.

BACKGROUND

This disclosure relates to an actuator assembly. This disclosure further relates to a method and an apparatus for manufacturing an actuator assembly. This disclosure further relates to a valve comprising an actuator assembly.

There are many technical fields using actuators made of a shape memory alloy (SMA). The technical application of this type of actuator requires a mechanical connection of the actuator to a casing which provides resistance to the occurring forces. If the actuator is formed as a SMA wire, the mechanical connection is usually realized by means of crimp joining. However, crimp joining is rather unsuitable for actuators made of a shape memory alloy having a planar geometry.

DE 31 41 216 A1 describes a fixation process of planar actuator elements made of a shape memory alloy within a tube by means of rivets. The rivets exclusively provide a mechanical connection to the tube. The shape memory effect is activated by means of the temperature of a gas flowing through the tube.

DE 197 54 747 A1 discloses a device for being implanted into hollow space of human body in particular into gullet. The device consists of a mesh with polygonal cells and is made of synthetic material or a thin metal wire. The areas where the threads meet are fixed with tubular rivets. First the threads are joined in order to form a specific shape like the inside of the gullet, wound around the cylindrical shaft of the rivet and then permanently fixed. The individual cells of the mesh should be ideally wider at both ends of the device and narrow in the middle to give maximum support.

DE 10 2016 219 245 A1 discloses a coupling device which is rotatably supportable about an axis of rotation, wherein the coupling device comprises at least one lamellae carrier and a component, wherein the lamellae carrier is fixed to the component in a torque proof and axial proof manner, wherein the plate carrier comprises a first material and the component comprises a second material, wherein the first material is different from the second material. The fixation is realized by means of a rivet which fixation also may use a biasing means made of a shape memory material.

Despite the advantages provided by these devices and methods for fixation disclosed in these prior art documents, there are still some drawbacks. Particularly, with all mentioned prior art documents, exclusively a mechanical connection of the respective actuator elements by means of rivets is disclosed. Thus, an electrical operation of these actuators is not possible or requires a further electrical connection.

SUMMARY

This disclosure teaches a mechanical connection of an actuator made of a shape memory material wherein an electrical connection for applying a heating current and effective removal of heat is also possible.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "substrate," "circuit path," "actuator," and "through hole," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

The term "shape memory material" as used herein is a broad term and is to be given its ordinary and customary meaning to a person of ordinary skill in the art and is not to be limited to a special or customized meaning. The term specifically may refer, without limitation, to any material that has the ability to return from a deformed state (temporary shape) to its original (permanent) shape induced by an external stimulus (trigger), such as temperature change. Such shape memory material may be shape-memory polymers (SMPs) or shape-memory alloys (SMAs). For example, a shape-memory alloy is an alloy that can be deformed when cold but returns to its pre-deformed ("remembered") shape when heated. Shape-memory polymers differ from shape memory alloys by their glass transition or melting transition from a hard to a soft phase which is responsible for the shape-memory effect. In shape-memory alloys martensitic/austenitic transitions are responsible for the shape-memory effect.

The term "substrate" as used herein is a broad term and is to be given its ordinary and customary meaning to a person of ordinary skill in the art and is not to be limited to a special or customized meaning. The term specifically may refer, without limitation, to any device suitable to support or carry an actuator and circuit paths. Such a substrate may be a common circuit board made of a rigid material, a circuit board made of a flexible material such as Kapton or a three-dimensional casing having circuit paths applied thereto.

The term "permanently fixed," "permanently fix" or equivalents thereof as used herein is a broad term and is to be given its ordinary and customary meaning to a person of ordinary skill in the art and is not to be limited to a special or customized meaning. The term specifically may refer, without limitation, to a fixation not releasable or not releasable without destruction of the connection members. Such a permanent fixation is preferably a positive fit or positive locking. A non-limiting example for a permanent fixation is a fixation of two connection members by means of a rivet.

The term "actuator" as used herein is a broad term and is to be given its ordinary and customary meaning to a person of ordinary skill in the art and is not to be limited to a special or customized meaning. The term specifically may refer, without limitation, to an arbitrary element which is configured to move or control a mechanism or a system. The actuator may be operated by a source of energy, typically electric current or heat.

The term "circuit path" as used herein is a broad term and is to be given its ordinary and customary meaning to a person of ordinary skill in the art and is not to be limited to a special or customized meaning. The term specifically may refer, without limitation, to a trace made of an electrically conductive material such as copper which is configured to provide an electrical connection of at least two constructional members.

The terms "first," "second" etc. as used herein are merely used to distinguish between different constructional members or features but do not define a certain order of importance.

The term "actuating section" as used herein is a broad term and is to be given its ordinary and customary meaning to a person of ordinary skill in the art and is not to be limited to a special or customized meaning. The term specifically may refer, without limitation, to that part of the actuator that connects the ends thereof and that is deformed in the cold state and performs the actuation movement by restoring its memory shape when heated above the temperature Af. It may have a variety of shapes including a straight bridge, several parallel straight bridges, several non-parallel, intersecting straight bridges, meandering structures, bows, spiral arms, "Kirigami"-like structures formed by introducing a number of cuts into the actuator plane. The actuating section should preferably be stressed as uniformly as possible when deforming the actuator in order to omit mechanical failure. The actuating section should allow heating by applying a heating current between the first end and second end of the actuator. In this case, the current density should be as uniform as possible in order to achieve uniform heating of the entire actuating section.

The term "biased" as used herein is a broad term and is to be given its ordinary and customary meaning to a person of ordinary skill in the art and is not to be limited to a special or customized meaning. The term specifically may refer, without limitation, to a pre-strained state of shape. With other words, a biased structure or element is deflected with respect to the memory shape of a shape memory material.

In a first aspect of this disclosure, there is provided an actuator assembly which comprises at least one substrate having at least a first circuit path and/or a second circuit path mounted on at least one side of the substrate, at least one actuator made at least partially of a shape memory material, wherein the actuator comprises at least a first end and a second end, and at least one fixing member. The first end comprises a first actuator through hole, wherein the first circuit path comprises a first support surface defining a first circuit path through hole. The substrate comprises a first substrate through hole. The first actuator through hole, the first circuit path through hole and the first substrate through hole overlap one another. The fixing member extends through the first actuator through hole, the first circuit path through hole and the first substrate through hole such that the actuator is permanently fixed to the substrate and the first circuit path at least at the first end by means of the fixing member. As the substrate carries circuit paths, these circuit paths may be used to supply the actuator with electrical power and to remove heat therefrom. As the actuator is made of a shape memory material, the actuator can exist in two different phases having different shapes and structures, respectively. As these phases have different geometries, shapes or structures, the actuator is allowed to move to a certain extension. This movement may be used to operate a further constructional member such as switching between at least two different positions or gradual or linear movement. It is explicitly stated that such gradual movement of a shape memory actuator may be used for implementation of an actuator assembly that may be operated by open-loop or closed-loop control, e.g., a proportional valve (e.g., for dosing), a mixing valve or an optical aperture. As the first actuator through hole, the first circuit path through hole and the first substrate through hole overlap one another, the fixing member may be inserted into these holes so as to extend therethrough. Thus, with a single process step, a mechanical connection of the substrate, the first circuit path and the actuator may be realized which also allows to supply the actuator with electrical power such as a heating current and/or to remove heat from the actuator. It has to be noted that the overlapping of the first actuator through hole, the first circuit path through hole and the first substrate through hole is not necessarily limited to this given order but may be realized in any order. For example, the actuator and the first circuit path may be located on different sides of the substrate.

Alternatively or in addition, the second end may comprise a second actuator through hole. The second circuit path may comprise a second support surface defining a second circuit path through hole. The substrate may comprise a second substrate through hole. The second actuator through hole, the second circuit path through hole and the second substrate through hole may overlap one another. The fixing member may extend through the second actuator through hole, the second circuit path through hole and the second substrate through hole such that the actuator is permanently fixed to the substrate and the second circuit path at the second end by means of the fixing member. As the second actuator through hole, the second circuit path through hole and the second substrate through hole overlap one another, a further or additional fixing member may be inserted into these holes so as to extend therethrough. Thus, with a single process step, a further or second mechanical connection of the substrate, the second circuit path and the actuator may be realized which also allows to supply the actuator with electrical power such as a heating current and/or to remove heat from the actuator. Thereby, the actuator may be fixed to the substrate and the two different circuit paths at two different locations.

The fixing member (also referred to herein as "fastener") may be a rivet, wherein the rivet is preferably made from an electrically conductive material and/or has an electrically conductive surface coating. Preferably, the rivet is a hollow rivet. Thus, an electrical connection of the actuator to the first and/or second circuit path may be realized by means of the rivet. This allows to supply the actuator with a heating current. If the rivet is made of an electrically conductive material, its manufacturing may be easier or more cost effective than the provision of an electrically conductive surface coating. Alternatively, the rivet may be made of a broad range of materials such as a shape memory alloy, a thermoplastic material or any other material. Preferably, the (electrically conductive) surface finish of the fixing member is non-corrosive.

The actuator is preferably electrically connected to the first circuit path and/or the second circuit path by means of the fixing member or fastener. The electrical connection of the actuator to the first circuit path and/or the second circuit path may be realized in that the actuator is pressed onto the first circuit path and/or the second circuit path. Alternatively, the electrical connection of the actuator to the first circuit path and/or the second circuit path may be realized in that the fixing member is made of an electrically conductive material or comprises an electrically conductive material such as a coating which allows supplying the actuator with electrical power even if not in direct contact to the first circuit path and/or the second circuit path such as across the substrate.

The first circuit path and the second circuit path on the one hand side and the actuator on the other hand side may be located on the same side of the substrate. Thus, the manufacturing of the actuator assembly may be simplified and the fixing member does not necessarily have to be made of or comprise an electrically conductive material.

Alternatively, the first circuit path and the second circuit path on the one hand side and the actuator on the other hand side may be located on opposing sides of the substrate. In this case, the fixing member has to be made of or comprise an electrically conductive material. The advantage of this construction is that the side of the substrate opposing the actuator may provide more space for the provision of the circuit paths and other electronic components if applicable or the actuator assembly in total may be designed smaller.

The actuator assembly may further comprise at least two actuators made of a shape memory material, wherein the two actuators are on the same side of the substrate. Thus, actuator assembly may comprise two or more actuators such as three, four etc. actuators which arrangement allows to provide movements in several directions and/or actuation with several dependent or independent degrees of freedom.

The at least two actuators may be connected to one another by means of an intermediate member. The connection of the two or more actuators by means of the intermediate member may be realized after the manufacturing of the actuators. Alternatively, the actuators and the intermediate member may be integrally or monolithically formed such as by being cut off from a shape memory material foil. Two or more actuators may be connected to one another. For example, three or four actuators are arranged in a star shaped manner so as to realize a two-dimensional movement. If the intermediate member comprises a slot or opening, the actuator assembly may be used in association with an optical aperture or a gate valve.

The at least two actuators may be biased in opposite directions. Thus, a linear actuation movement is allowed. If the two or more actuators are not biased against one another, the actuators were in their shape memory state and the application of a heating current to one of the actuators would not result in a modification or variation of the shape and thereby in an actuation or movement.

The actuator assembly may further comprise at least two actuators made of a shape memory material, wherein the two actuators are on opposing sides of the substrate. This decreases the total space for the arrangement of two or more actuators.

The two actuators on opposing sides of the substrate may be biased with respect to each other. By this, a movement orthogonal to the substrate plane ("out-of-plane") can be realized. In this case, it might be beneficial to have one actuator on the top side and the other on the bottom side of the substrate.

The at least two actuators may be permanently fixed to the substrate and at least one first circuit path at least at the first ends thereof by means of a single fixing member. This decreases the total space for the arrangement of two or more actuators as a common circuit path such as common ground may be used for the actuators.

The actuator assembly may further comprise two substrates, wherein at least one of the substrates has at least a first circuit path and a second circuit path mounted thereon, wherein the actuator is located between the two substrates. Thus, the circuit paths do not necessarily have to be provided on all substrates. Rather, for each end to be connected at least one circuit path must be provided on at least one substrate.

The actuator assembly may further comprise a casing, wherein the actuator is permanently fixed to the substrate, the first circuit path and the casing at least at the first end by means of the fixing member. Thereby, the actuator may be at least partially enclosed so as to be protected from the environment. Alternatively, the substrate may be formed as a casing. Thus, the actuator may be directly fixed to a casing by means of the fixing member.

The substrate may be a circuit board member. Thus, the actuator may be fixed to well established electronic components which allows to decrease the costs for its manufacturing. The electronic components may include microcontrollers and transistors for controlling the power supply of the actuator, energy storages such as batteries or supercapacitors, electrical connectors or plugs, sensors for supervising the ambient conditions and/or actuator condition such as temperature, fluid flow, position (e.g., hall sensors), electrical resistance, light intensity.

The substrate may be flexible. A flexible substrate may fulfil the function of a connection cable such that a further cable may be omitted.

The substrate may be a casing comprising at least one circuit path, which is preferably formed by selective surface metallization.

The actuator assembly may further comprise an elastic resetting member configured to reset the actuator into its original (shape memory) position. Such a resetting member may be used to reset the actuator into its original deformed shape when power supply is stopped, as the shape memory effect only occurs when the actuator is heated above a material-specific critical temperature Af.

The elastic resetting member may be permanently fixed to the substrate by means of at least one fixing member such as by means of at least one rivet. Thus, the actuator and the resetting member may be fixed to the substrate by means of the same tool or apparatus and/or within the same process step.

The actuator assembly may further comprise a lever, wherein the actuator is configured to move, particularly pivot, the lever. Thus, the actuator assembly may be used to induce a pivotal or linear movement which is particularly usable in model building.

The actuator may be formed substantially planar at least at the first and/or second end. Thus, the thickness of the actuator assembly may be reduced. Needless to say, the whole actuator may be planar. For example, the actuator may comprise a thickness in a range of 10 µm to 200 µm, which may be present at least at the first and/or second end. Such at least partially planar actuators may be realized as foil, film, plate, sheet, band, flat wire; conventional wire with flattened ends. Such at least partially planar actuators may be manufactured by means of physical vapor deposition such as sputter deposition, cold rolling, cold drawing, mechanical thinning, grinding, polishing, melt spinning or the like. The respective shape may be defined by means of photolithography, wire cutting, laser cutting, water jet cutting or stamping.

The first end and the second end of the actuator may be connected to one another by means of at least one actuating section. The actuating section allows providing a structure that is deformed when cold and remember its shape when being heated. Such an actuating section may be similar to a bar, berth or bridge connecting the ends.

The at least one actuating section may be formed straight or curved, particularly meandering, or Kirigami-like, i.e., formed by introducing a variety of straight or curved cuts into the planar shape memory material. Thus, the shape of the actuating section may be adapted to the respective application of the actuator assembly.

The shape memory material may be a shape memory alloy, preferably NiTi or NiTiCu, or shape memory polymer. Such materials are well known and can be well processed.

In a second aspect of this disclosure, there is provided a method for manufacturing an actuator assembly, particularly an actuator assembly as described before, comprising:
  providing at least one substrate having at least a first circuit path and/or a second circuit path mounted on at least one side of the substrate,
  providing at least one actuator made at least partially of a shape memory material, wherein the actuator comprises at least a first end and a second end, wherein the first end comprises a first actuator through hole, wherein the first circuit path comprises a first support surface defining a first circuit path through hole, wherein the substrate comprises a first substrate through hole,
  arranging the substrate and the actuator such that the first actuator through hole, the first circuit path through hole and the first substrate through hole overlap one another,
  providing at least one fixing member, and
  inserting the fixing member through the first actuator through hole, the first circuit path through hole and the first substrate through hole so as to permanently fix the actuator to the substrate and the first circuit path at least at the first end by means of the fixing member.

With this method, the above described advantages or effects may be achieved.

Alternatively or in addition, the second end may comprise a second actuator through hole. The second circuit path may comprise a second support surface defining a second circuit path through hole. The substrate may comprise a second substrate through hole. The method may further comprise arranging the substrate and the actuator such that the second actuator through hole, the second circuit path through hole and the second substrate through hole overlap one another, and inserting the fixing member through the second actuator through hole, the second circuit path through hole and the second substrate through hole so as to permanently fix the actuator to the substrate and the second circuit path at the second end by means of the fixing member.

With the method, the actuator may be electrically connected to the first circuit path and/or the second circuit path at first end and/or at the second end by means of the fixing member.

The fixing member may be a rivet, particularly, a hollow rivet, and the method may further comprise pressing the rivet so as to permanently fix the actuator to the substrate and the first circuit path and/or the second circuit path. Thus, a fixation which may be released only when destroying the same may be realized.

The actuator may be concertedly permanently fixed to the substrate, the first circuit path and the second circuit path at first end and at the second end by means of the fixing member. Thus, with a single process step, the actuator may be fixed to the substrate and the circuit paths at two different locations or positions which accelerates or facilitates the manufacturing.

The method may further comprise providing at least two actuators made of a shape memory material, wherein the at least two actuators are arranged on the same side of the substrate. Thus, the method allows to provide an actuator assembly comprising two or more actuators so as to realize movements in several directions.

The method may further comprise biasing the two actuators in opposite directions. If the two or more actuators are not biased against one another, the actuators were in their shape memory state and the application of a heating current to one of the actuators would not result in a modification or variation of the shape.

The method may further comprise providing at least two actuators made of a shape memory material, wherein the at least two actuators are arranged on opposite sides of the substrate. Thus, the method allows to reduce the size of the actuator assembly.

The shape memory material is a shape memory alloy or shape memory polymer. Thus, a broad range of well-established materials may be used.

In a third aspect of this disclosure, there is provided an apparatus for manufacturing an actuator assembly as described before. The apparatus comprises a lower part and an upper part, wherein the lower part comprises a base having at least two holding members (also referred to herein as "holders") for holding the substrate, the actuator at a first end thereof and at least one fixing member in a predetermined position relative to one another, wherein the upper part comprises at least two pressing members, wherein the upper part and the lower part are moveable towards one another such that the pressing members engage the holding members, wherein an engagement of the pressing members and the holding members is configured to press and deform the fixing member such that the actuator is permanently fixed to the substrate and the first circuit path at least at the first end. With this apparatus, a mechanical connection of the actuator to the substrate and the first circuit path may be realized in a single working step.

Alternatively or in addition, the holding members may be configured to hold the substrate, the actuator at the first end and at a second end thereof, and at least two fixing members in a predetermined position relative to one another, wherein the upper part comprises at least two pressing members, wherein the upper part and the lower part are moveable towards one another such that the pressing members engage the holding members, wherein an engagement of the pressing members and the holding members is configured to press and deform the fixing members such that the actuator is permanently fixed to the substrate, the first circuit path at the first end and the second circuit path at the second end. With this apparatus, a mechanical connection of the actuator to the substrate, the first circuit path and the second circuit path may be realized in a single working step.

The holding members may be commonly or independently from one another biased towards the upper part. Thus, the holding members may at least partially retract into the lower part engaging the pressing members. Thus, the pressing force is more evenly distributed.

The base may have individually moveable groups of holding members for holding the substrate, at least one actuator at the first and second ends thereof and at least two fixing members, wherein each group comprises at least one holding member, wherein the upper part comprises groups of pressing members, wherein the upper part and the lower part are moveable towards one another such that the pressing members engage the holding members, wherein an engagement of the pressing members and the holding members is configured to press and deform the fixing members such that the at least one actuator is permanently fixed to the substrate, the circuit path at the first end and second circuit paths at the second end. Thus, the at least one actuator may be fixed to the substrate and the respective circuit paths at the same time. Needless to say, this will also work for two or more actuators, which may all be fixed to the substrate and the respective circuit paths at the same time.

The groups of holding members may be moveable relative to one another so as to bias the actuators in opposite directions. Thus, a linear actuation movement is allowed. If the two or more actuators are not biased against one another, the actuators were in their shape memory state already when still cold and the application of a heating current to one of the actuators would not result a modification or variation of the shape.

The apparatus may further comprise a supply device configured to supply a plurality of actuators connected to one another to the lower part, and/or a separating device configured to separate one of the plurality of actuators, and/or a moving device configured to move the lower part towards a first position in which a separated actuator is disposable on the holding members and a second position in which the lower part is engageable by the upper part. Thus, a plurality of actuators assemblies may be manufactured with a single apparatus which significantly decreases the manufacturing costs.

The plurality of actuators may be connected in a row, in a matrix or any other spatial configuration.

In a fourth aspect of this disclosure, there is provided a valve comprising, a valve member, a valve seat, and an actuator assembly according to the above described embodiments, wherein the actuator is configured to selectively move the valve member to the valve seat or away from the valve seat so as to close or open the valve. Thus, the actuator assembly may be applied to a valve so as to move the valve member precisely from an open position, which allows to pass fluid through the valve, to a closed position, which prevents fluid from passing therethrough, and vice versa.

The valve may be a gate valve.

Alternatively, the valve may be a seat valve.

Summarizing and without excluding further possible embodiments, the following embodiments may be envisaged:

Embodiment 1

An actuator assembly comprising at least one substrate having at least a first circuit path and/or a second circuit path mounted on at least one side of the substrate, at least one actuator made at least partially of a shape memory material, wherein the actuator comprises at least a first end and a second end, and at least one fixing member, wherein the first end comprises a first actuator through hole, wherein the first circuit path comprises a first support surface defining a first circuit path through hole, wherein the substrate comprises a first substrate through hole, wherein the first actuator through hole, the first circuit path through hole and the first substrate through hole overlap one another, wherein the fixing member extends through the first actuator through hole, the first circuit path through hole and the first substrate through hole such that the actuator is permanently fixed to the substrate and the first circuit path at least at the first end by means of the fixing member.

Embodiment 2

The actuator assembly according to embodiment 1, wherein the second end comprises a second actuator through hole, wherein the second circuit path comprises a second support surface defining a second circuit path through hole, wherein the substrate comprises a second substrate through hole, wherein the second actuator through hole, the second circuit path through hole and the second substrate through hole overlap one another, wherein the fixing member extends through the second actuator through hole, the second circuit path through hole and the second substrate through hole, wherein the actuator is permanently fixed to the substrate and the second circuit path at the second end by means of the fixing member.

Embodiment 3

The actuator assembly according to embodiment 1 or 2, wherein the fixing member is a rivet, preferably a hollow rivet, wherein the rivet is preferably made from an electrically conductive material and/or has an electrically conductive surface coating which preferably is corrosion-resistant/non-corrosive (preferably gold).

Embodiment 4

The actuator assembly according to any one of embodiments 1 to 3, wherein the actuator is electrically connected to the first circuit path and/or the second circuit path by means of the fixing member.

Embodiment 5

The actuator assembly according to any one of embodiments 1 to 4, wherein the first circuit path and the second circuit path on the one hand side and the actuator on the other hand side are located on the same side of the substrate.

Embodiment 6

The actuator assembly according to any one of embodiments 1 to 4 wherein the first circuit path and the second circuit path on the one hand side and the actuator on the other hand side are located on opposing sides of the substrate.

Embodiment 7

The actuator assembly according to any one of embodiments 1 to 6, further comprising at least two actuators made of a shape memory material, wherein the two actuators are on the same side of the substrate.

Embodiment 8

The actuator assembly according to embodiment 7, wherein the at least two actuators are connected to one another by means of an intermediate member.

Embodiment 9

The actuator assembly according to embodiment 8, wherein the at least two actuators are biased in opposite directions.

Embodiment 10

The actuator assembly according to any one of embodiments 1 to 6, further comprising at least two actuators made of a shape memory material, wherein the two actuators are located on opposing sides of the substrate.

Embodiment 11

The actuator assembly according to embodiment 10, wherein the at least two actuators are permanently fixed to the substrate and at least one first circuit path at least at the first ends thereof by means of a single fixing member.

Embodiment 12

The actuator assembly according to any one of embodiments 1 to 6, further comprising two substrates, wherein at least one of the substrates has at least a first circuit path and a second circuit path mounted thereon, wherein the actuator is located between the two substrates.

Embodiment 13

The actuator assembly according to any one of embodiments 1 to 12, further comprising a casing, wherein the actuator is permanently fixed to the substrate, the first circuit path and the casing at least at the first end by means of the fixing member or the substrate is formed as a casing, particularly a casing comprising at least one circuit path, which is preferably formed by selective surface metallization.

Embodiment 14

The actuator assembly according to any one of embodiments 1 to 13, wherein the substrate is a circuit board member.

Embodiment 15

The actuator assembly according to any one of embodiments 1 to 14, wherein the substrate is flexible.

Embodiment 16

The actuator assembly according to any one of embodiments 1 to 15, further comprising an elastic resetting member configured to reset the actuator into its original position.

Embodiment 17

The actuator assembly according to embodiment 16, wherein the elastic resetting member is permanently fixed to the substrate by means of at least one fixing member, particularly by means of at least one rivet.

Embodiment 18

The actuator assembly according to embodiment 16 or 17, wherein the substrate is a casing.

Embodiment 19

The actuator assembly according to any one of embodiments 16 to 18, further comprising a lever, wherein the actuator is configured to move, particularly pivot, the lever.

Embodiment 20

The actuator assembly according to any one of embodiments 1 to 19, wherein the actuator is formed substantially planar at least at the first and/or second end.

Embodiment 21

The actuator assembly according to any one of embodiments 1 to 20, wherein the first end and the second end of the actuator are connected to one another by means of at least one actuating section.

Embodiment 22

The actuator assembly according to embodiment 21, wherein the at least one actuating section is formed straight or curved, particularly meandering.

Embodiment 23

The actuator assembly according to any one of embodiments 1 to 22, wherein the shape memory material is a shape memory alloy, preferably NiTi or NiTiCu, or a shape memory polymer.

Embodiment 24

A method for manufacturing an actuator assembly, particularly an actuator assembly according to any one of embodiments 1 to 23, comprising:
  providing at least one substrate having at least a first circuit path and/or a second circuit path mounted on at least one side of the substrate,
  providing at least one actuator made at least partially of a shape memory material, wherein the actuator comprises at least a first end and a second end, wherein the first end comprises a first actuator through hole, wherein the first circuit path comprises a first support surface defining a first circuit path through hole, wherein the substrate comprises a first substrate through hole, arranging the substrate and the actuator such that the first actuator through hole, the first circuit path through hole and the first substrate through hole overlap one another, providing at least one fixing member, and inserting the fixing member through the first actuator through hole, the first circuit path through hole and the first substrate through hole so as to permanently fix the actuator to the substrate and the first circuit path at least at the first end by means of the fixing member.

Embodiment 25

The method according to embodiment 24, wherein the second end comprises a second actuator through hole, wherein the second circuit path comprises a second support surface defining a second circuit path through hole, wherein the substrate comprises a second substrate through hole, wherein the method further comprises arranging the substrate and the actuator such that the second actuator through hole, the second circuit path through hole and the second substrate through hole overlap one another, and inserting the fixing member through the second actuator through hole, the second circuit path through hole and the second substrate through hole so as to permanently fix the actuator to the substrate and the second circuit path at the second end by means of the fixing member.

Embodiment 26

The method according to any one of embodiments 24 to 25, wherein the actuator is electrically connected to the first circuit path and/or the second circuit path at first end and/or at the second end by means of the fixing member.

Embodiment 27

The method according to any one of embodiments 24 to 26, wherein the fixing member is a rivet and the method further comprises pressing the rivet so as to permanently fix the actuator to the substrate and the first circuit path and/or the second circuit path.

Embodiment 28

The method according to any one of embodiments 24 to 27, wherein the actuator is concertedly permanently fixed to the substrate, the first circuit path and the second circuit path at first end and at the second end by means of the fixing member.

Embodiment 29

The method according to any one of embodiments 25 to 28, further comprising providing at least two actuators made of a shape memory material, wherein the at least two actuators are arranged on the same side of the substrate.

Embodiment 30

The method according to embodiment 29, further comprising biasing the two actuators in opposite directions.

Embodiment 31

The method according to any one of embodiments 24 to 29, further comprising providing at least two actuators made of a shape memory material, wherein the at least two actuators are arranged on opposite sides of the substrate.

Embodiment 32

The method according to any one of embodiments 24 to 31, wherein the shape memory material is a shape memory alloy or shape memory polymer.

Embodiment 33

An apparatus for manufacturing an actuator assembly according to any one of embodiments 1 to 32, comprising a lower part and an upper part, wherein the lower part comprises a base having at least two holding members for holding the substrate, the actuator at a first end thereof and at least one fixing member in a predetermined position relative to one another, wherein the upper part comprises at least two pressing members, wherein the upper part and the lower part are moveable towards one another such that the pressing members engage the holding members, wherein an engagement of the pressing members and the holding members is configured to press and deform the fixing member such that the actuator is permanently fixed to the substrate and the first circuit path at least at the first end.

Embodiment 34

The apparatus according to embodiment 33, wherein the holding members are configured to hold the substrate, the actuator at the first end and at a second end thereof, and at least two fixing members in a predetermined position relative to one another, wherein the upper part comprises at least two pressing members, wherein the upper part and the lower part are moveable towards one another such that the pressing members engage the holding members, wherein an engagement of the pressing members and the holding members is configured to press and deform the fixing members such that the actuator is permanently fixed to the substrate, the first circuit path at the first end and the second circuit path at the second end.

Embodiment 35

The apparatus according to embodiment 34, wherein the holding members are commonly or independently from one another biased towards the upper part.

Embodiment 36

The apparatus according to any one of embodiments 33 to 35, wherein the base has individually moveable groups of holding members for holding the substrate, at least one actuator at the first and second ends thereof and at least two fixing members, wherein each group comprises at least one holding member, wherein the upper part comprises groups of pressing members, wherein the upper part and the lower part are moveable towards one another such that the pressing members engage the holding members, wherein an engagement of the pressing members and the holding members is configured to press and deform the fixing members such that the at least one actuator is permanently fixed to the substrate, the circuit path at the first end and second circuit path at the second end.

Embodiment 37

The apparatus according to any one of embodiments 33 to 35, wherein the base has individually moveable groups of holding members for holding the substrate, at least two actuators at the first and second ends thereof and four fixing members, wherein each group comprises at least one holding member, wherein the upper part comprises groups of pressing members, wherein the upper part and the lower part are moveable towards one another such that the pressing members engage the holding members, wherein an engagement of the pressing members and the holding members is configured to press and deform the fixing members such that the at least two actuators are permanently fixed to the substrate, circuit paths at the first ends and second circuits paths at the second ends.

Embodiment 38

The apparatus according to embodiment 36 or 37, wherein the groups of holding members are moveable relative to one another so as to bias the actuators in opposite directions and/or to bias the first end and the second end of a single actuator in opposite directions.

Embodiment 39

The apparatus according to any one of embodiments 33 to 38, further comprising a supply device configured to supply a plurality of actuators connected to one another to the lower part, and/or a separating device configured to separate one of the plurality of actuators, and/or a moving device configured to move the lower part towards a first position in which a separated actuator is disposable on the holding members and a second position in which the lower part is engageable by the upper part.

Embodiment 40

A valve comprising, a valve member, a valve seat, and an actuator assembly according to one of embodiments 1 to 23, wherein the actuator is configured to selectively move the valve member to the valve seat or away from the valve seat so as to close or open the valve.

Embodiment 41

The valve according to embodiment 40, wherein the valve is a gate valve.

Embodiment 42

The valve according to embodiment 40, wherein the valve is a seat valve.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
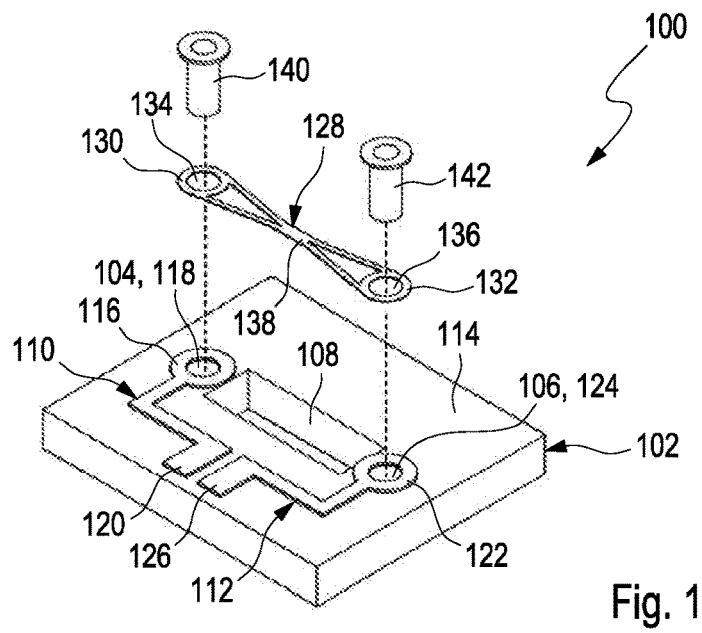
FIG. 1A shows an exploded view of an actuator assembly according to a first embodiment.
FIG. 1B shows a perspective view of the actuator assembly according to the first embodiment.
FIG. 1C shows a cross-sectional view of the actuator assembly according to the first embodiment.
FIG. 1D shows a plan view of the actuator assembly according to the first embodiment.
Figure 1:
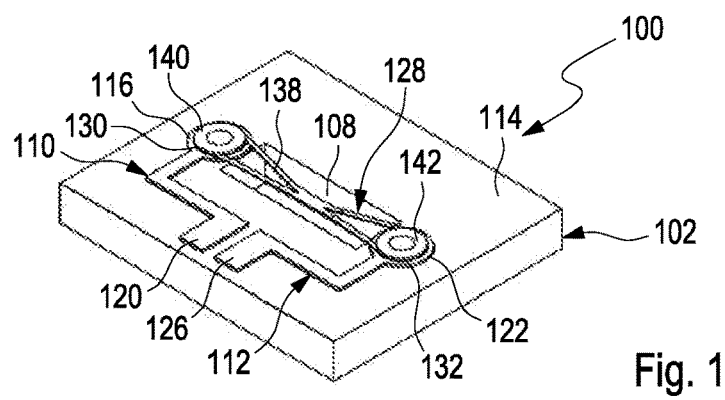
Figure 1:
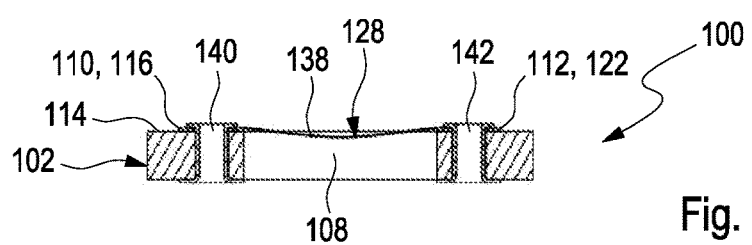
Figure 1:
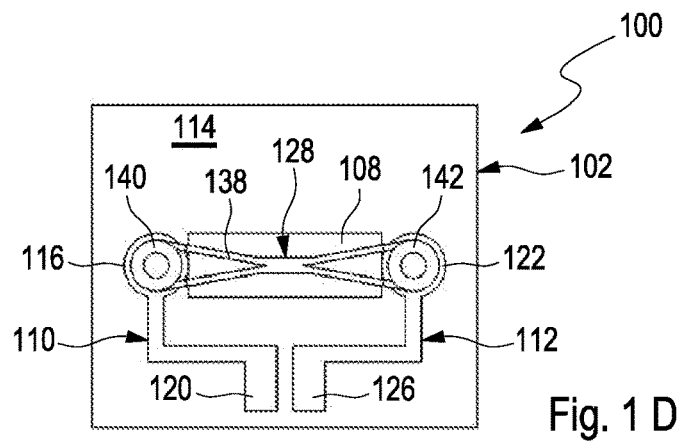

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

FIG. 1A shows an explosion view of an actuator assembly according to a first embodiment of this disclosure. FIG. 1B shows a perspective view of the actuator assembly 100 according to the first embodiment of this disclosure. FIG. 1C shows a cross-sectional view of the actuator assembly 100 according to the first embodiment of this disclosure. FIG. 1D shows a plan view of the actuator assembly 100 according to the first embodiment of this disclosure. The actuator assembly 100 comprises at least one substrate 102. The substrate is a circuit board member such as a printed circuit board. The substrate 102 is made of an electrically non-conductive material such as fiber-reinforced plastics. The substrate comprises a first substrate through hole 104 and a second substrate through hole 106. The substrate 102 further comprises an opening 108 which is located substantially in a central portion of the substrate 102. The opening is formed rectangular. Needless to say, the opening 108 may be located at any position in the substrate as appropriate such as an eccentric position and may have any shape such as rounded, oval, polygonal or polygonal with rounded edges. The first substrate through hole 104 and the second substrate through hole 106 are located at opposing ends of the opening 108 such that the opening 108 is located between the first substrate through hole 104 and the second substrate through hole 106.

The substrate 102 has at least a first circuit path 110. Further, the substrate 102 has a second circuit path 112 mounted on at least one side of the substrate. It is explicitly stated that only one circuit path may be provided and one of the two circuit paths shown in FIGS. 1A to 1D may be replaced by a cable or the like. In the embodiment shown in FIGS. 1A to 1D, the first circuit path 110 and the second circuit path 112 are both mounted to a top side 114 of the substrate 102. The first circuit path 110 comprises a first support surface 116 defining a first circuit path through hole 118 at one end thereof. The first circuit path 110 further comprises a first contact pad 120 at the other end thereof. The second circuit path 112 comprises a second support surface 122 defining a second circuit path through hole 124 at one end thereof. The second circuit path 112 further comprises a second contact pad 126 at the other end thereof. The first circuit path 110 and the second circuit path 112 are made of a material being electrically conductive such as copper. The first circuit path 110 and the second circuit path 112 have a thickness and height, respectively, of at least 25 µm, preferably at least 30 µm, and comprise a thin coating made from an electrically well-conducting, non-corrosive material such as gold. The first circuit path 110 and the second circuit path 112 are spatially separated and insulated from one another. It is explicitly stated that alternatively to the above explanations, the substrate 102 may be made from an electrically conductive material such as copper or aluminum having the advantage, among other things, of having a better thermal conductivity than common insulating substrate materials. In this case, the substrate comprises a thin coating made of an electrically insulating material provided between the substrate outer surface and within the first substrate through hole 104 and the second substrate through hole 106.

The actuator assembly 100 further comprises at least one actuator 128 made at least partially of a shape memory material. The shape memory material is a shape memory alloy such as NiTi or NiTiCu. Alternatively, the shape memory material is a shape memory polymer comprising electrically conductive surface structures reaching from the first actuator through hole 134 to the second actuator through hole 136 which are suitable to act as resistive heating elements. The actuator 128 comprises at least a first end 130 and a second end 132. The first end 130 comprises a first actuator through hole 134. The second end 132 comprises a second actuator through hole 136. The actuator 128 is formed substantially planar at least at the first end 130 and/or second end 132. The first end 130 and the second end 132 of the actuator 128 are connected to one another by means of at least one actuating section 138, which is two intersecting straight bridges with the first embodiment. The actuator 128 is disposed on the first circuit path 110 and the second circuit path 112. More particularly, the actuator 128 is supported at the first support surface 116 with the first end 130, is supported at the second support surface 122 with the second end 132 and the actuating section 138 extends across the opening 108 of the substrate 102. The first actuator through hole 134, the first circuit path through hole 118 and the first substrate through hole 104 overlap one another. The second actuator through hole 136, the second circuit path through hole 124 and the second substrate through hole 106 overlap one another. Thus, the first circuit path 110 and the second circuit path 112 on the one hand side and the actuator 128 on the other hand side are located on the same side of the substrate 102 which is the top side 114 with the first embodiment.

The actuator assembly 100 further comprises at least one fixing member (also referred to herein as a "fastener") 140. The fixing member 140 is a rivet such as a hollow rivet. In the first embodiment, two fixing members are present which are indicated as first fixing member 140 and second fixing member 142. Unless otherwise stated, all explanations below apply to both fixing members 140, 142. The first fixing member 140 extends through the first actuator through hole 134, the first circuit path through hole 118 and the first substrate through hole 104 such that the actuator 128 is permanently fixed to the substrate 102 and the first circuit path 110 at least at the first end 130 by means of the first fixing member 140. The second fixing member 142 extends through the second actuator through hole 136, the second circuit path through hole 124 and the second substrate through hole 106 such that the actuator 128 is permanently fixed to the substrate 102 and the second circuit path 112 at the second end 132 by means of the second fixing member 142. Particularly, as is best shown in FIG. 1C, the respective collars or heads of the fixing members 140, 142 press the actuator 128, the circuit paths 110, 112 and the substrate 102 onto one another such that the fixation thereof is not releasable without destroying these constructional members. The actuator 128 is electrically connected to the first circuit path 110 and the second circuit path 112 by means of the fixing members 140, 142 as these press the actuator 128 at the first end 130 and the second end 132, respectively, onto the first support surface 116 and the second support surface 122, respectively. With the first embodiment, the fixing members 140, 142 may be made of a material being electrically conductive or electrically non-conductive.

FIGS. 2A to 2D show an apparatus 200 for manufacturing the actuator assembly 100 according to the first embodiment of this disclosure with different manufacturing steps. The apparatus 200 comprises a lower part 202 and an upper part 204. The lower part 202 comprises a base 206 having at least two holding members (also referred to as "holders") 208 for holding the substrate 102, the actuator 128 at a first end 130 thereof and at least one fixing member 140, 142 in a predetermined position relative to one another. More particularly, the holding members 208 are configured to hold the substrate 102, the actuator 128 at the first end 130 and at a second end 132 thereof, and at least two fixing members (fasteners) 140, 142 in a predetermined position relative to one another. The upper part 204 comprises at least two pressing members (also referred to herein as "pressers") 210. The upper part 204 and the lower part 202 are moveable towards one another such that the pressing members 210 engage the holding members 208, wherein an engagement of the pressing members 210 and the holding members 208 is configured to press and deform the fixing member 140 such that the actuator 128 is permanently fixed to the substrate 102 and the first circuit path 110 at least at the first end 130. Preferably, the lower part 202 and the upper part 204 are rigidly connected by a linear bearing, assuring their precise alignment (not shown in the figure). Preferably, the upper part 204 is pressed upon the lower part 202 by a pneumatic or hydraulic drive (not shown in the figure). More particularly, the engagement of the pressing members 210 and the holding members 208 is configured to press and deform the fixing members 140, 142 such that the actuator 128 is permanently fixed to the substrate 102, the first circuit path 110 at the first end 130 and the second circuit path 112 at the second end 132. Further, the holding members 208 are commonly biased towards the upper part 204 by means of a spring 212. Alternatively, the holding members 208 may be independently from one another biased towards the upper part 204. In this case, each holding member 208 is associated with a separate spring.

Figure 2:
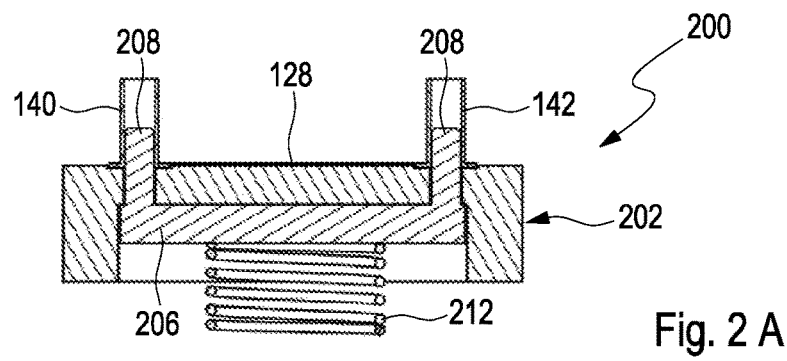
FIGS. 2A to 2D show an apparatus for manufacturing the actuator assembly according to the first embodiment with different manufacturing steps.
Figure 2:
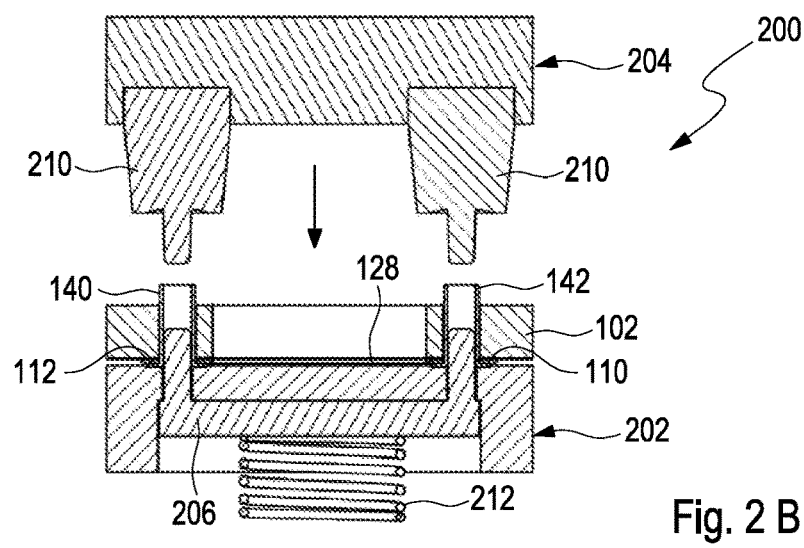
Figure 2:
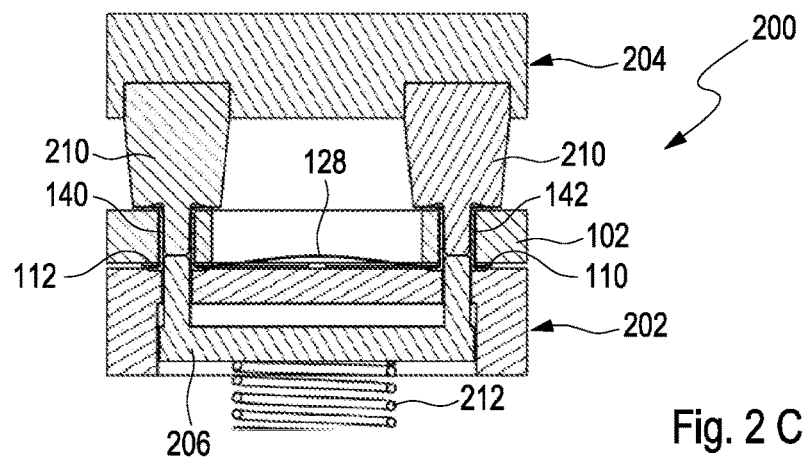
Figure 2:
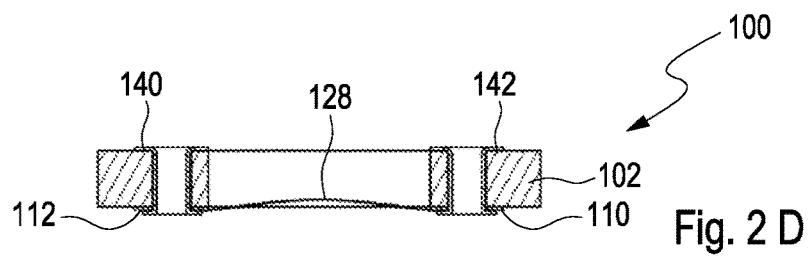

Hereinafter, a method for manufacturing the actuator assembly 100 according to the first embodiment will be described with reference to the apparatus 200. As shown in FIG. 2A, the method comprises providing at least one fixing member 140, 142. With the first embodiment, two fixing members 140, 142 are provided. The fixing members 140, 142 are rivets such as hollow rivets. Preferably, the rivets may comprise an electrically well conducting, non-corrosive surface coating such as gold. Onto each of the holding members 208, one of the fixing members 140, 142 is disposed. Then, the actuator 128 is provided. The actuator 128 is disposed onto the holding members 208 such that the first fixing member 140 is inserted through the first actuator through hole 134 and the second fixing member 142 is inserted through the second actuator through hole 136.

As shown in FIG. 2B, the method further comprises providing the substrate 102. The substrate 102 is disposed onto the holding members 208 such that the first circuit path 110 and the second circuit path 112 face the actuator 128. More particularly, the substrate 102 and the actuator 128 are arranged such that the first actuator through hole 134, the first circuit path through hole 118 and the first substrate through hole 104 overlap one another. Further, the substrate 102 and the actuator 128 are arranged such that the second actuator through hole 136, the second circuit path through hole 124 and the second substrate through hole 106 overlap one another. Thus, the first fixing member 140 is inserted through the first actuator through hole 134, the first circuit path through hole 118 and the first substrate through hole 104. Further, the second fixing member 142 is inserted through the second actuator through hole 136, the second circuit path through hole 124 and the second substrate through hole 106.

As shown in FIG. 2C, the upper part 204 and the lower part 202 are moved towards one another such that the pressing members 210 engage the holding members 208. Thereby, the fixing members 140, 142 are pressed and deformed so as to permanently fix the actuator 128 to the substrate 102 and the first circuit path 110 at least at the first end 130 by means of the first fixing member and to permanently fix the actuator 128 to the substrate 102 and the second circuit path 112 at the second end 132 by means of the second fixing member 142.

FIG. 2D shows a cross-sectional view of the actuator assembly 100 manufactured with this method. As shown in FIG. 2D, finally the actuator assembly 100 is removed from the apparatus 200. Particularly, with this apparatus 200, the actuator 128 is concertedly permanently fixed to the substrate 102, the first circuit path 110 and the second circuit path 112 at first end 130 and at the second end 132 by means of the fixing members 140, 142. Further, the actuator 128 is electrically connected to the first circuit path 110 and the second circuit path 112 at first end 130 and at the second end 132 by means of the fixing members 140, 142.

It is explicitly stated that the substrate 102 may be disposed onto the lower part 202 with the fixing members 140, 142 first and then the actuator 128 is disposed. This can be used if the substrate does not have a plane surface for the disposition of the actuator.

FIGS. 3A to 3F show a modification of the apparatus 200 for manufacturing the actuator assembly 100. It has to be noted that the upper part 204 is not shown in FIGS. 3A to 3F for sake of transparency. The modified apparatus 200 further comprises a supply device (supply) 214 configured to supply a plurality of actuators 128 connected to one another to the lower part 202. Merely as an example, the plurality of actuators 128 are shown as being connected to one another in a row. The supply device 214 is a roller configured to convey the plurality of actuators 128 in a linear manner. The modified apparatus 200 further comprises a separating device (separator) 216 configured to separate one of the plurality of actuators 128. The separating device 216 is a knife configured to cut-off the first actuator 128 in the row as seen in the conveying direction of the supply device 214 from the remaining actuators 128 when being convey to the lower part 202. The modified apparatus 200 further comprises a moving device 218 configured to move the lower part 202 towards a first position in which the separated actuator 128 is disposable on the holding members 208 and a second position in which the lower part 202 is engageable by the upper part 204. The moving device 218 is a device similar to a carriage device or a shuttle device configured to linearly move the lower part 202 between the first position and second position.

Figure 3:
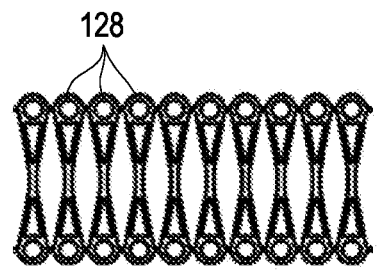
FIGS. 3A to 3F show a modification of the apparatus for manufacturing the actuator assembly.
Figure 3:
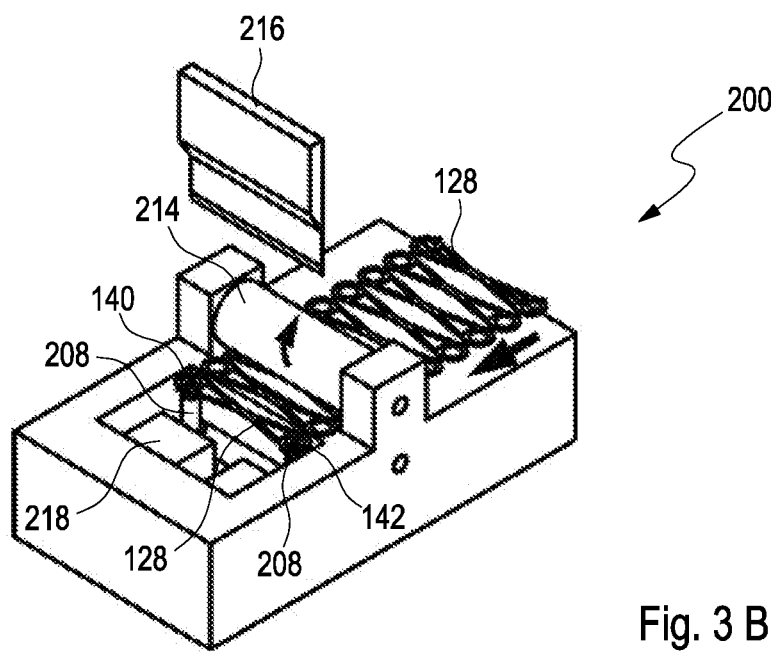
Figure 3:
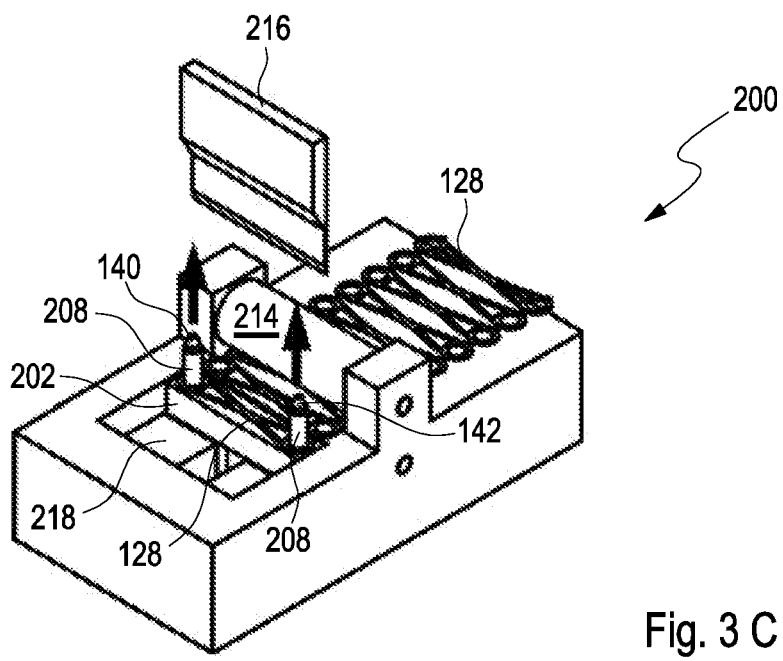
Figure 3:
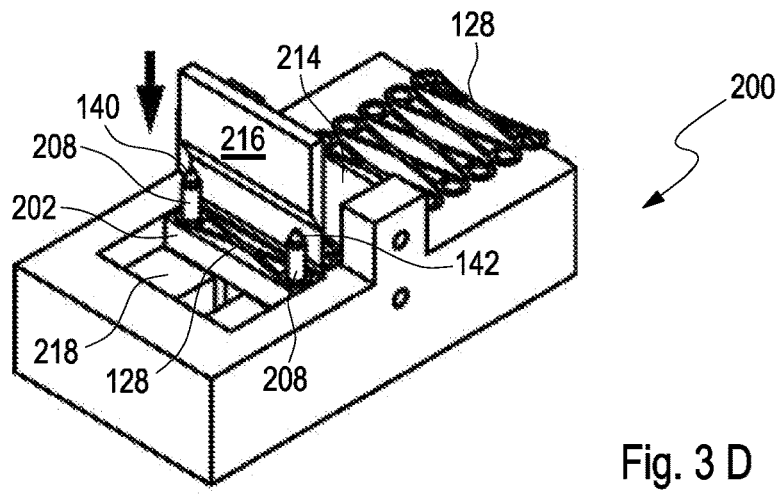
Figure 3:
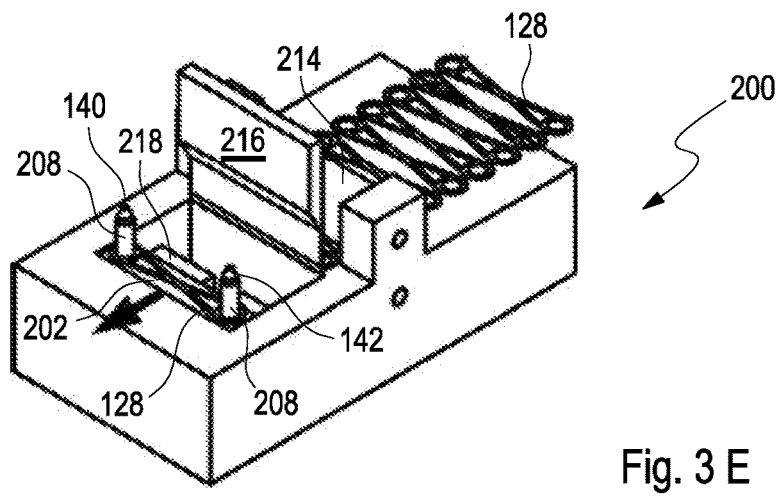
Figure 3:
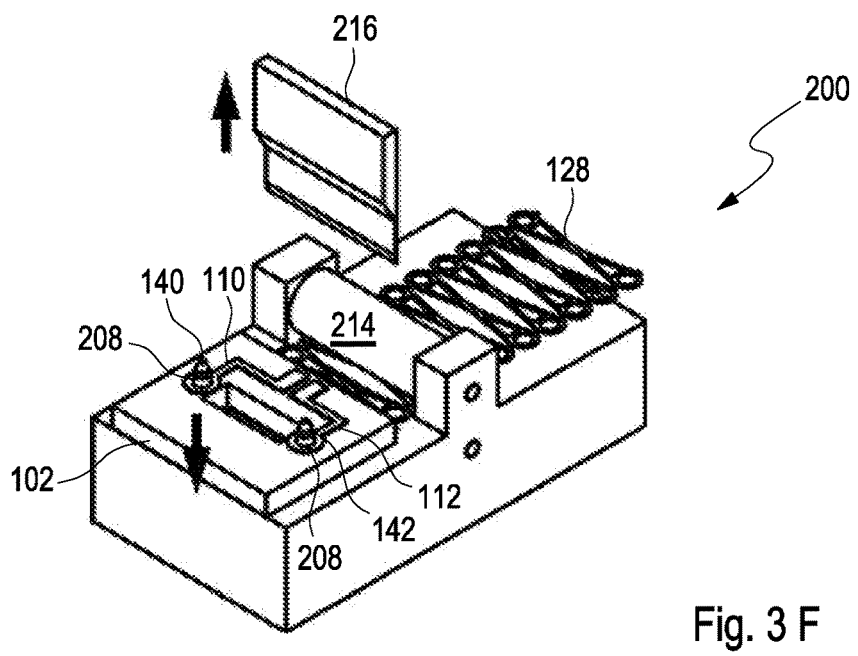

Hereinafter, a method for manufacturing the actuator assembly 100 according to the first embodiment will be described with reference to the modified apparatus 200 with reference to FIGS. 3A to 3F. As shown in FIG. 3A, which is a plan view, the method comprises providing a plurality of actuators 128 connected to one another in a row. The actuators 128 may be connected to one another by means of small bars at the first ends 130 and the second ends 132, respectively.

As shown in FIG. 3B, which is a perspective view of the modified apparatus 200, the method further comprises providing at least one fixing member 140, 142. With the first embodiment, two fixing members 140, 142 are provided. The fixing members 140, 142 are rivets such as hollow rivets. Onto each of the holding members 208, one of the fixing members 140, 142 is disposed. The supply device 214 supplies the plurality of actuators 128 connected to one another in a row towards the lower part 202. More particularly, the base 206 of the lower part 202 is in a lowered position and the first actuator 128 in the row is supplied to a position above the lower part 202 by means of the supply device 214. The moving device 218 has moved the lower part 202 to the first position.

As shown in FIG. 3C, which is a perspective view of the modified apparatus 200, the base 206 of the lower part 202 is raised such that the first fixing member 140 is inserted through the first actuator through hole 134 and the second fixing member 142 is inserted through the second actuator through hole 136. Thereby, the first actuator 128 in the row is disposed onto the holding members 208.

As shown in FIG. 3D, which is a perspective view of the modified apparatus 200, the separating device 216 is lowered so as to cut-off the first actuator 128 in the row from the remaining actuators 128. Thereby, the first actuator 128 in the row is separated from the remaining actuators 128.

As shown in FIG. 3E, which is a perspective view of the modified apparatus 200, the moving device 218 moves the lower part 202 to the second position and away from the supply device 214 or the separating device 216.

As shown in FIG. 3F, which is a perspective view of the modified apparatus 200, the method further comprises providing the substrate 102. The substrate 102 is disposed onto the holding members 208 such that the first circuit path 110 and the second circuit path 112 face away from the actuator 128. In other words, the actuator 128 on the one hand side and the first circuit path 110 and the second circuit path 112 on the other hand side are located on opposing sides of the substrate 102. Alternatively, the substrate 102 may be disposed onto the holding members 208 such that the first circuit path 110 and the second circuit path 112 face towards the actuator 128. More particularly, the substrate 102 and the actuator 128 are arranged such that the first actuator through hole 134, the first circuit path through hole 118 and the first substrate through hole 104 overlap one another. Further, the substrate 102 and the actuator 128 are arranged such that the second actuator through hole 136, the second circuit path through hole 124 and the second substrate through hole 106 overlap one another. Thus, the first fixing member 140 is inserted through the first actuator through hole 134, the first circuit path through hole 118 and the first substrate through hole 104. Further, the second fixing member 142 is inserted through the second actuator through hole 136, the second circuit path through hole 124 and the second substrate through hole 106.

Even if not explicitly shown in FIG. 3F, the upper part 204 and the lower part 202 are moved towards one another such that the pressing members 210 engage the holding members 208. Thereby, the fixing members 140, 142 are pressed and deformed so as to permanently fix the actuator 128 to the substrate 102 and the first circuit path 110 at least at the first end 130 by means of the first fixing member and to permanently fix the actuator 128 to the substrate 102 and the second circuit path 112 at the second end 132 by means of the second fixing member 142. Finally, the actuator assembly 100 is removed from the apparatus 200. Particularly, with this apparatus 200, the actuator 128 is concertedly permanently fixed to the substrate 102, the first circuit path 110 and the second circuit path 112 at first end 130 and at the second end 132 by means of the fixing members 140, 142. Further, the actuator 128 is electrically connected to the first circuit path 110 and the second circuit path 112 at first end 130 and at the second end 132 by means of the fixing members 140, 142.

FIGS. 4A to 4H show cross-sectional views of actuator assemblies 100 according to second to ninth embodiments. The actuator assemblies shown in FIGS. 4A to 4H represent variations of the general principle of the present disclosure. General advantages of some of the variations are (especially when more than one actuator is mounted to a substrate):
 saving space,
 reducing total number of fixing members (fasteners) by using one fixing member to fix one end of two or more actuators, respectively, and thus, again saving space, material cost and assembly time,
 reducing total number of circuit paths, thus again saving space and simplifying electronics. SMA actuators are essentially electrical resistors which are connected to a (+) and a (−) pole of a current source with their first end and second end in order to heat them. The (−) pole (at a first end) of all actuators may easily be connected ("common ground") and each actuator can still be heated separately by closing its individual connection to (+) (at a second end). Hence, for N independent actuators, which are stacked with one end (on one or both sides of the substrate) and fixed by a single, shared fixing member at that respective end, only N+1 fixing members, N circuit paths connected to (+) and one circuit path connected to (−) would be required.

The purpose of a cavity is to allow the one or more actuator(s) to be deflected "into" the substrate and/or omit friction of the actuator and the substrate when an actuator is moving in parallel to the substrate.

Figure 4:
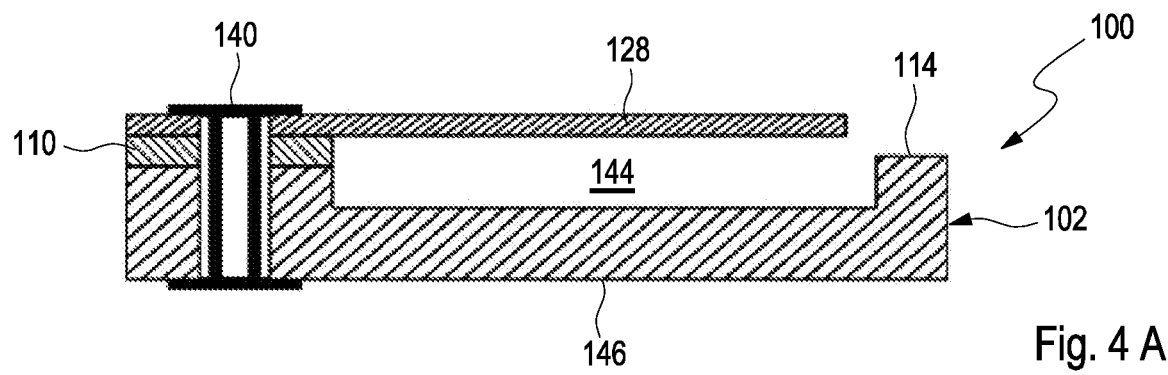
FIGS. 4A to 4H show cross-sectional views of actuator assemblies according to second to ninth embodiments.
Figure 4:
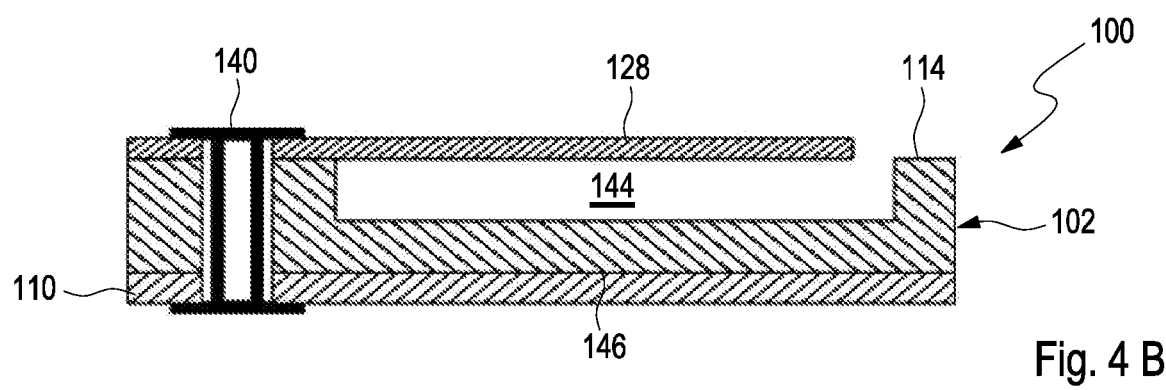
Figure 4:
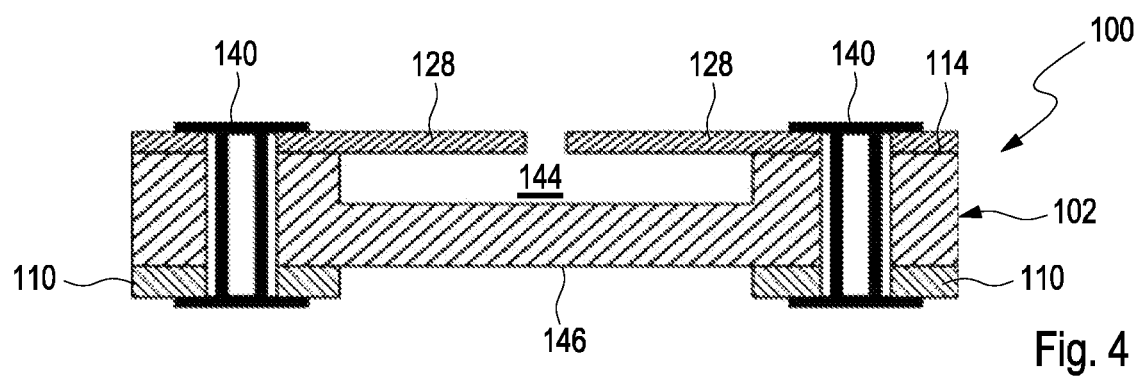
Figure 4:
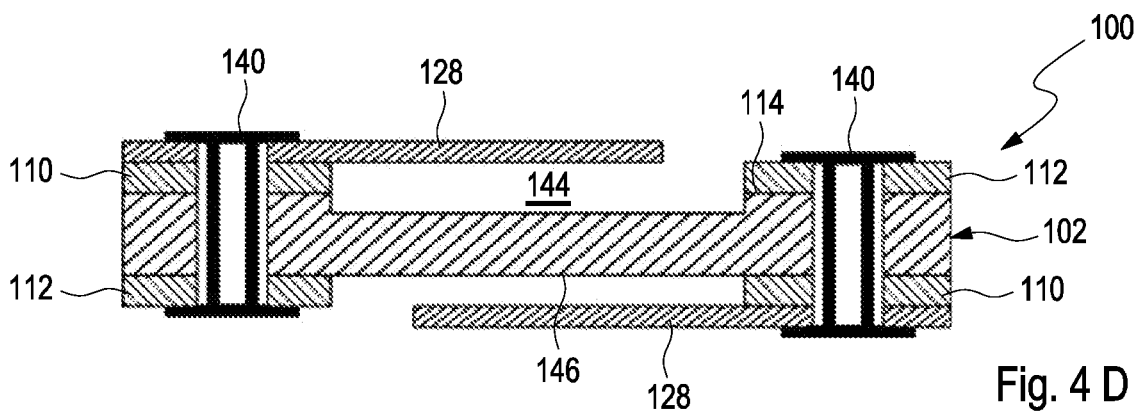
Figure 4:
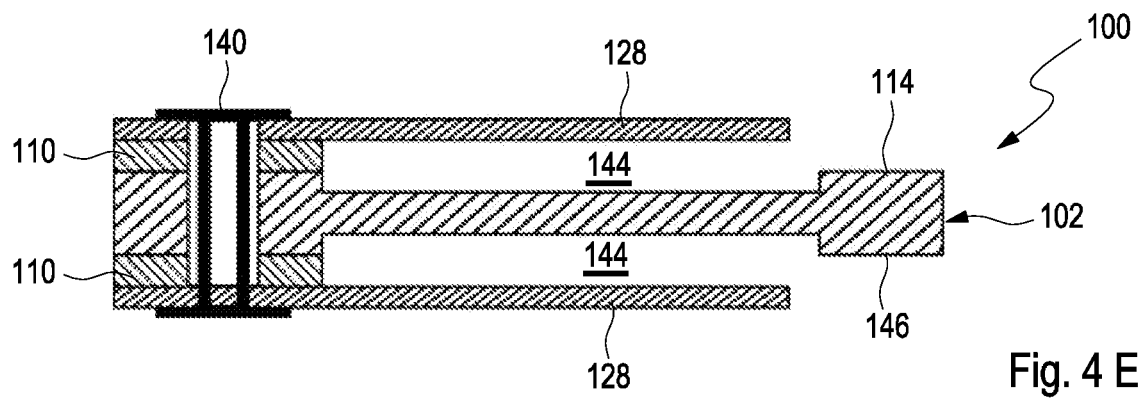
Figure 4:
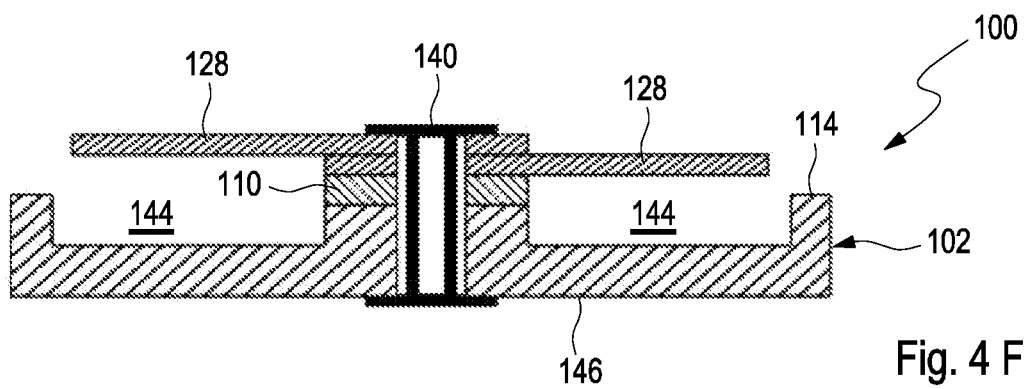
Figure 4:
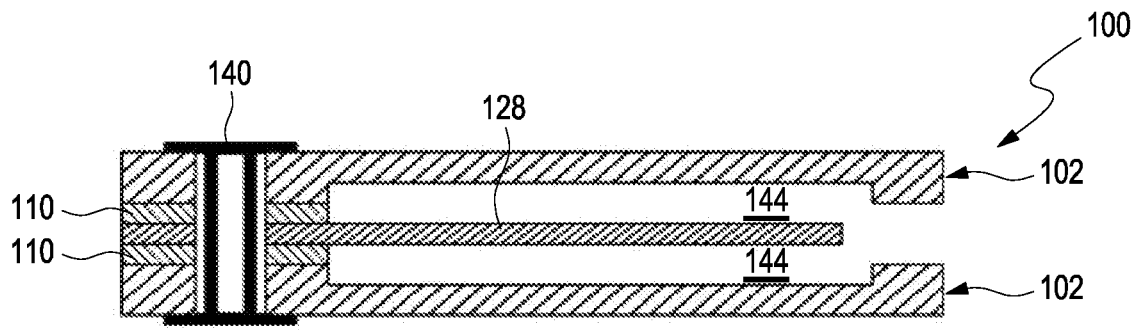
Figure 4:
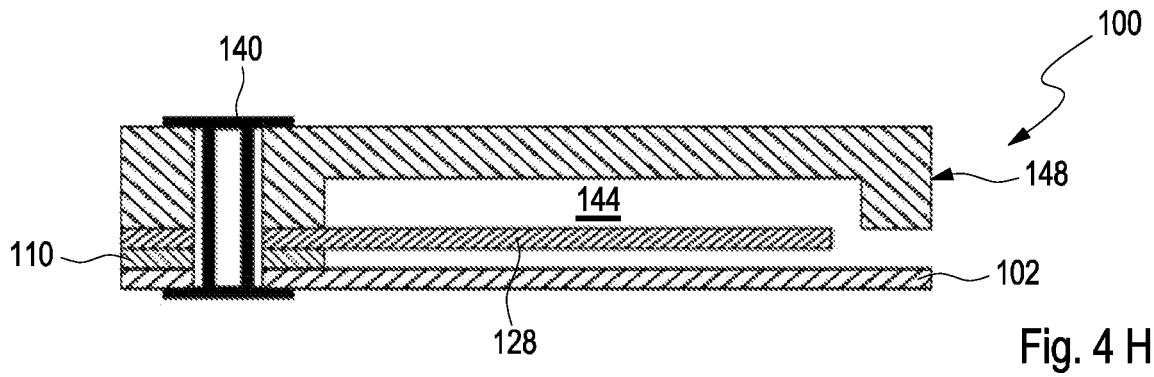

FIG. 4A shows a cross-sectional view of an actuator assembly 100 according to a second embodiment. Hereinafter, only the differences from the actuator assembly 100 according to the first embodiment will be explained and like or comparable constructional members are indicated by like reference numerals. The substrate 102 comprises a cavity 144. With the actuator assembly 100 according to the second embodiment, the first circuit path 110 and the second circuit path 112 (not shown in detail) on the one hand side and the actuator 128 on the other hand side are located on the same side of the substrate 102 which is the top side 114. Needless to say, only one circuit path may be present as described above. The actuator 128 is disposed at least on the first circuit path 110. More particularly, the actuator 128 is supported at the first support surface 116 with the first end 130. The first actuator through hole 134, the first circuit path through hole 118 and the first substrate through hole 104 overlap one another. The actuator 128 extends above the cavity 144. Only one fixing member 140 is present. The fixing member 140 extends through the first actuator through hole 134, the first circuit path through hole 118 and the first substrate through hole 104. With the second embodiment, the actuator 128 directly contacts the first circuit path 110 at its first end 130. Particularly, the fixing member 140 presses the first end 130 of the actuator 128 onto the first support surface 116 of the first circuit path 110. Thus, the actuator 128 is electrically connected to the first circuit path 110 by means of the fixing member 140. In this case, the fixing member 140 does not necessarily need to be made of an electrically conductive material.

FIG. 4B shows a cross-sectional view of an actuator assembly 100 according to a third embodiment. Hereinafter, only the differences from the actuator assembly 100 according to the first embodiment will be explained and like or comparable constructional members are indicated by like reference numerals. The substrate 102 comprises a cavity 144. With the actuator assembly 100 according to the third embodiment, the first circuit path 110 and the second circuit path 112 (not shown in detail) on the one hand side and the actuator 128 on the other hand side are located on opposing sides of the substrate 102. Needless to say, only one circuit path may be present as described above. While the actuator 128 is directly located on the top side 114 of the substrate 102, the first circuit path 110 and the second circuit path 112 are located on the lower side 146 of the substrate 102. The first actuator through hole 134, the first circuit path through hole 118 and the first substrate through hole 104 overlap one another. The actuator 128 extends above the cavity 144. Only one fixing member 140 is present. The fixing member 140 extends through the first actuator through hole 134, the first circuit path through hole 118 and the first substrate through hole 104 With the third embodiment, the fixing member 140 is made of an electrically conductive material or comprises a coating made of an electrically conductive material. Even though the actuator 128 does not directly contact the first circuit path 110 at its first end 130, the actuator 128 is electrically connected to the first circuit path 110 by means of the fixing member 140.

FIG. 4C shows a cross-sectional view of an actuator assembly 100 according to a fourth embodiment. Hereinafter, only the differences from the actuator assembly 100 according to the first embodiment will be explained and like or comparable constructional members are indicated by like reference numerals. The substrate 102 comprises a cavity 144. With the actuator assembly 100 according to the fourth embodiment, two actuators 128 are present. Associated with each of the two actuators 128, is a first circuit path 110 and a second circuit path 112 having the design as described above. Thus, in total there are four circuit paths present. Further, associated with each actuator 128, the substrate 102 comprises first substrate through hole 104. Thus, in total there are two first substrate through holes 104 present. The first circuit paths 110 and the second circuit paths 112 (not shown in detail) on the one hand side and the actuators 128 on the other hand side are located on opposing sides of the substrate 102. Needless to say, only one circuit path per actuator 128 may be present as described above. While the actuators 128 are directly located on the top side 114 of the substrate 102, the first circuit paths 110 and the second circuit paths 112 are located on the lower side 146 of the substrate 102. Concerning each of the actuators 128, the first actuator through hole 134, the first circuit path through hole 118 and the first substrate through hole 104 overlap one another. The actuators 128 extend above the cavity 144. Concerning each of the actuators 128, only one fixing member 140 is present, wherein the fixing member 140 extends through the first actuator through hole 134, the first circuit path through hole 118 and the first substrate through hole 104. With the fourth embodiment, each fixing member 140 is made of an electrically conductive material or comprises a coating made of an electrically conductive material. Even though the actuators 128 do not directly contact the associated first circuit path 110 at its first end 130, the actuators 128 are electrically connected to the first circuit path 110 by means of the fixing member 140.

FIG. 4D shows a cross-sectional view of an actuator assembly 100 according to a fifth embodiment. Hereinafter, only the differences from the actuator assembly 100 according to the first embodiment will be explained and like or comparable constructional members are indicated by like reference numerals. The substrate 102 comprises a cavity 144. With the actuator assembly 100 according to the fifth embodiment, two actuators 128 are present. Associated with each of the two actuators 128, is a first circuit path 110 and a second circuit path 112 having the design as described above. Thus, in total there are four circuit paths present. Needless to say, only one circuit path per actuator 128 may be present as described above. Further, associated with each actuator 128, the substrate 102 comprises a first substrate through hole 104. Thus, in total there are two first substrate through holes 104 present. The actuators 128 are located on opposing sides of the substrate 102. Concerning each of the actuator 128, the first circuit path 110 and the actuator 128 on the one hand side and the second circuit path 112 on the other hand side are located on opposing sides of the substrate 102. Thus, there is one actuator 128 and its associated first circuit path 110 that are located on the top side 114 of the substrate 102 whereas its associated second circuit path 112 is located on the lower side 146 of the substrate 102. Further, there is another actuator 128 and its associated first circuit path 110 that are located on the lower side 146 of the substrate 102 whereas its associated second circuit path 112 is located on the top side 114 of the substrate 102. Concerning each of the actuators 128, the first actuator through hole 134, the first circuit path through hole 118 and the first substrate through hole 104 overlap one another. One of the actuators 128 extends above the cavity 144. Concerning each of the actuators 128, Only one fixing member 140 is present, wherein the fixing member 140 extends through the first actuator through hole 134, the first circuit path through hole 118 and the first substrate through hole 104. With the fifth embodiment, each fixing member 140 may be made of an electrically conductive material or comprises a coating made of an electrically conductive material. In any case, the actuators 128 are electrically connected to the first circuit path 110 by means of the fixing member 140.

FIG. 4E shows a cross-sectional view of an actuator assembly 100 according to a sixth embodiment. Hereinafter, only the differences from the actuator assembly 100 according to the first embodiment will be explained and like or comparable constructional members are indicated by like reference numerals. The substrate 102 comprises two cavities 144 located on opposing sides of the substrate 102. With the actuator assembly 100 according to the sixth embodiment, two actuators 128 are present. Associated with each of the two actuators 128, is a first circuit path 110 and a second circuit path 112 (not shown in detail) having the design as described above. Thus, in total there are four circuit paths present. Needless to say, only one circuit path per actuator 128 may be present as described above. Further, associated with both actuator 128, the substrate 102 comprises a single first substrate through hole 104. The actuators 128 are located on opposing sides of the substrate 102. Concerning each of the actuator 128, the first circuit path 110 and the actuator 128 are located on opposing sides of the substrate 102. Thus, there is one actuator 128 and its associated first circuit path 110 that are located on the top side 114 of the substrate 102 whereas there is another actuator 128 and its associated first circuit path 110 that are located on the lower side 146 of the substrate 102. Concerning the actuators 128, the first actuator through holes 134, the first circuit path through holes 118 and the single first substrate through hole 104 overlap one another. Each actuator 128 extends above one of the cavities 144. Concerning each of the actuators 128, a single fixing member 140 extends through the first actuator through holes 134, the first circuit path through holes 118 and the single first substrate through hole 104. Thus, a single fixing member 140 is sufficient to permanently fix two actuators 128 at their first ends 130 to the first circuit paths 110 and to the substrate 102. With the sixth embodiment, the fixing member 140 may be made of an electrically conductive material or comprises a coating made of an electrically conductive, preferably non-corrosive material. In any case, the actuators 128 are electrically connected to the first circuit path 110 by means of the fixing member 140.

FIG. 4F shows a cross-sectional view of an actuator assembly 100 according to a seventh embodiment. Hereinafter, only the differences from the actuator assembly 100 according to the first embodiment will be explained and like or comparable constructional members are indicated by like reference numerals. The substrate 102 comprises two cavities 144 located on the same side of the substrate 102. With the actuator assembly 100 according to the seventh embodiment, two actuators 128 are present. Associated with both of the two actuators 128, is a single first circuit path 110 and a second circuit path 112 (not shown in detail) having the design as described above. Thus, in total there are three circuit paths present. Needless to say, only one circuit path per actuator 128 may be present as described above. Further, associated with both actuator 128, the substrate 102 comprises a single first substrate through hole 104. The actuators 128 are located on the same side of the substrate 102 and one on top of the other. More particularly, the first circuit path 110 and both actuator 128 are located on the same side of the substrate 102. Thus, both actuators 128 share the first circuit path 110. Concerning the actuators 128, the first actuator through holes 134, the first circuit path through holes 118 and the single first substrate through hole 104 overlap one another. Each actuator 128 extends above one of the cavities 144. Concerning each of the actuators 128, a single fixing member 140 extends through the first actuator through holes 134, the first circuit path through hole 118 and the single first substrate through hole 104. Thus, a single fixing member 140 is sufficient to permanently fix two actuators 128 at their first ends 130 to the first circuit paths 110 and to the substrate 102. With the seventh embodiment, the fixing member 140 may be made of an electrically conductive material or comprises a coating made of an electrically conductive, preferably non-corrosive material. In any case, the actuators 128 are electrically connected to the first circuit path 110 by means of the fixing member 140. This design allows to reduce the constructional space as a common ground electrode may be used for both actuators. the second electrode must be provided separately in order to allow both actuators to be individually or independently on one another operated.

FIG. 4G shows a cross-sectional view of an actuator assembly 100 according to an eighth embodiment. Hereinafter, only the differences from the actuator assembly 100 according to the first embodiment will be explained and like or comparable constructional members are indicated by like reference numerals. With the actuator assembly 100 according to the eighth embodiment, two substrates 102 are present, each of which comprises a cavity 144. Associated with both of the two substrates 102, is a single actuator 128 and two first circuit paths 110 and two second circuit path 112 (not shown in detail) having the design as described above. Thus, in total there are four circuit paths present. Needless to say, only one circuit path per actuator 128 may be present as described above. Further, the substrate 102 comprises a single first substrate through hole 104. The actuator 128 is sandwiched between the substrates 102 and is contacted by the two first circuit paths 110 on opposing sides. The first actuator through hole 134, the first circuit path through holes 118 and the single first substrate through hole 104 overlap one another. The actuator 128 extends above each of the cavities 144. A single fixing member 140 extends through the first actuator through hole 134, the first circuit path through holes 118 and the single first substrate through hole 104. With the eighth embodiment, the fixing member 140 may be made of an electrically conductive material or comprises a coating made of an electrically conductive material. In any case, the actuator 128 is electrically connected to the first circuit paths 110 by means of the fixing member 140. This design allows to connect several circuit paths from different substrates to a single actuator and to protect the actuator from the environment or to improve the heat removal.

FIG. 4H shows a cross-sectional view of an actuator assembly 100 according to a ninth embodiment. Hereinafter, only the differences from the actuator assembly 100 according to the first embodiment will be explained and like or comparable constructional members are indicated by like reference numerals. With the actuator assembly 100 according to the ninth embodiment, the substrate 102 is a flexible substrate. Further, a casing 148 is present, which comprises a cavity 144. The first circuit path 110 and the second circuit path 112 (not shown in detail) on the one hand side and the actuator 128 on the other hand side are located on the same side of the substrate 102. Needless to say, only one circuit path per actuator 128 may be present as described above. Only one fixing member 140 is present. The actuator 128 is permanently fixed to the substrate 102, the first circuit path 110 and the casing 148 at least at the first end 130 by means of the fixing member 140. Particularly, the actuator 128 is sandwiched between the substrate 102 and the casing 148. Thus, the casing 148 serves to mechanically fix the actuators 128, to remove heat from the actuator 128 and to enclose the actuator 128. Further, the flexible substrate may replace a conventional connection cable.

Figure 5:
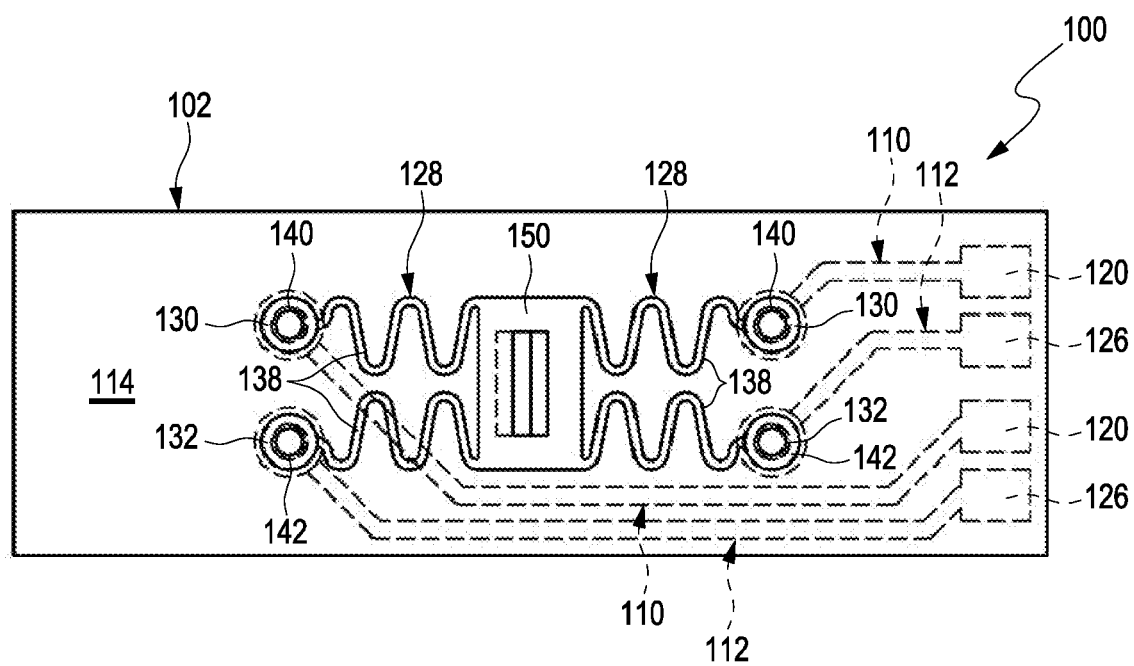
FIG. 5A shows a plan view of an actuator assembly according to a tenth embodiment.
FIG. 5B shows a plan view of the actuators of the actuator assembly according to the tenth embodiment.
Figure 5:
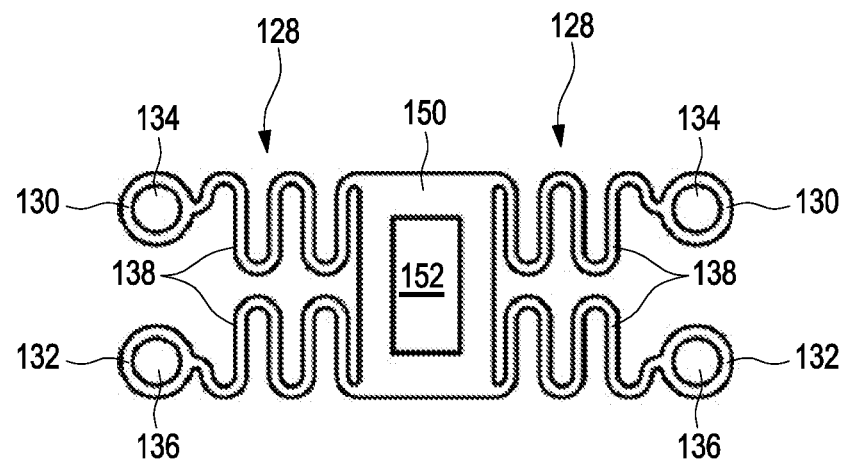

FIG. 5A shows a plan view of an actuator assembly 100 according to a tenth embodiment. Hereinafter, only the differences from the actuator assembly 100 according to the first embodiment will be explained and like or comparable constructional members are indicated by like reference numerals. The actuator assembly 100 according to the tenth embodiment comprises at least two actuators 128 made of a shape memory material. The two actuators 128 are located on the same side of the substrate 102. As can be taken from FIG. 5A, each of the actuators 128 is connected to a first circuit path 110 and a second circuit path 112 in the manner as described above. The actuators 128 on the one hand side and the first circuit paths 110 and the second circuit paths 112 on the other hand side are located on opposing sides of the substrate. For example, the actuators 128 are located on the top side 114 whereas the first circuit paths 110 and the second circuit paths 112 are located on the lower side as indicated by dashed lines. The first and second ends 130, 132 of the actuator 128 are connected to one another by means of an undulating or meandering actuating section 138.

FIG. 5B shows a plan view of the actuators 128 of the actuator assembly 100 according to the tenth embodiment. The at least two actuators 128 are connected to one another by means of an intermediate member 150. The intermediate member 150 comprises an orifice 152 such as an aperture. The at least two actuators 128 are biased in opposite directions. Thus, a linear actuation movement of the actuators 128 is allowed. If the two or more actuators 128 are not biased against one another, the actuators 128 were in their shape memory state and the application of a heating current to one of the actuators 128 would not result a modification or variation of the shape.

FIGS. 6A to 6G show an apparatus 300 for manufacturing the actuator assembly 100 according to the tenth embodiment with different manufacturing steps. The apparatus 200 comprises a lower part 302 and an upper part 304. The lower part 302 comprises a base 306. The base 306 has individually moveable groups 308, 310 of holding members 312 for holding the substrate 102, at least two actuators 128 at the first and second ends 130, 132 thereof and four fixing members 140, 142, 154, 156. Each group 308, 310 comprises at least one holding member 312. Analogously to the apparatus 200 of the first embodiment, the upper part 304 comprises groups of pressing members 314. The upper part 304 and the lower part 302 are moveable towards one another such that the pressing members 314 engage the holding members 312, wherein an engagement of the pressing members 314 and the holding members 312 is configured to press and deform the fixing members 140, 142 such that the at least two actuators are permanently fixed to the substrate 102, the first circuit paths 110 at the first ends 130 and second circuits paths 112 at the second ends 132. The groups 308, 310 of holding members 312 are moveable relative to one another in the actuator/substrate plane so as to bias the actuators 128 in opposite directions. In total, there are two groups 308, 310 and four holding members 312. The base 306 is divided in base portions 316, 318. Each group 308, 310 is disposed on a separate base portion 316, 318. Thus, there are also two base portions 316, 318. Further, there is a wedge-shaped lifting device 320 configured to raise so as to move between the base portions 316, 318 and to lower so as to move away from the base portions 316, 318. The base portions 316, 318 are laterally moveable which is perpendicular to the moving direction of the lifting device 320. Needless to say, while this apparatus allows to provide a biasing effect of the actuators, there are other possibilities to provide such a biasing. Thus, the described biasing is to be understood merely as an example. Basically, biasing may be realized in different ways, e.g., by increasing and/or decreasing the distance between the ends of one actuator, increasing and/or decreasing the distance of the end-groups of two connected actuators while leaving the distance between the two ends of each actuator in itself unchanged, rotating ends or groups of ends to achieve a rotational biasing, as well as combinations of the above. In general, displacing at least one end of at least one actuator relative to at least another end of the same or at least one other actuator will cause a biasing effect.

Figure 6:
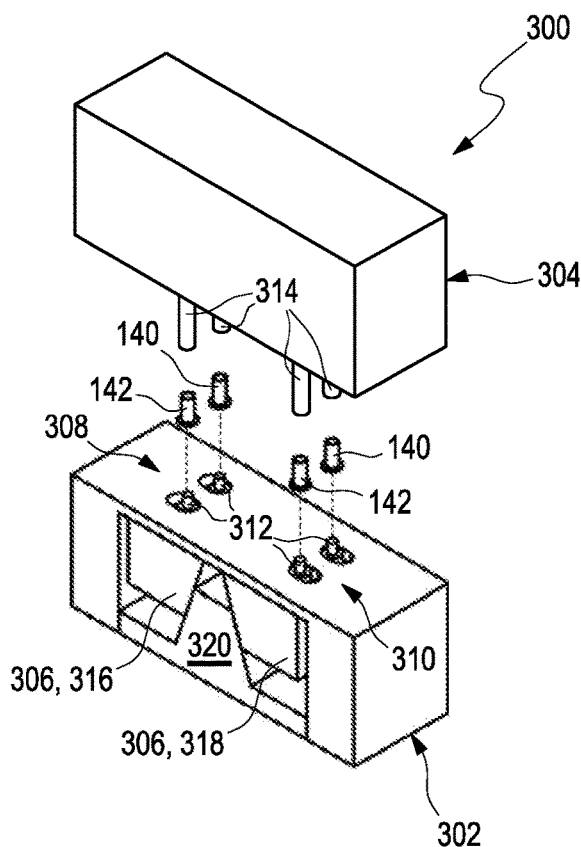
FIGS. 6A to 6G show an apparatus for manufacturing the actuator assembly according to the tenth embodiment with different manufacturing steps.
Figure 6:
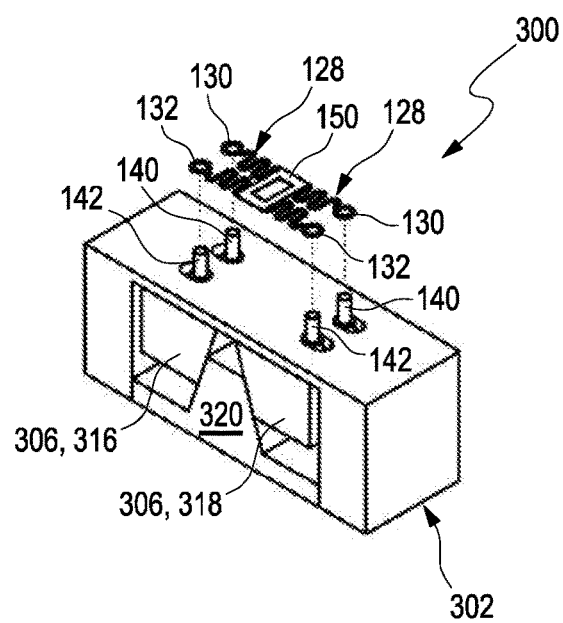
Figure 6:
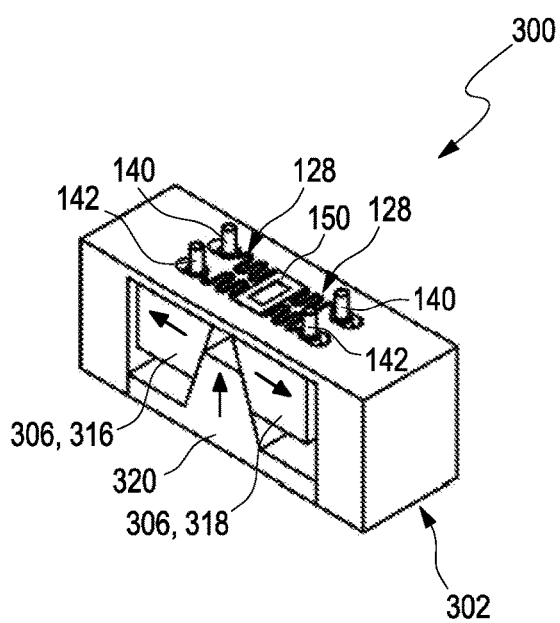
Figure 6:
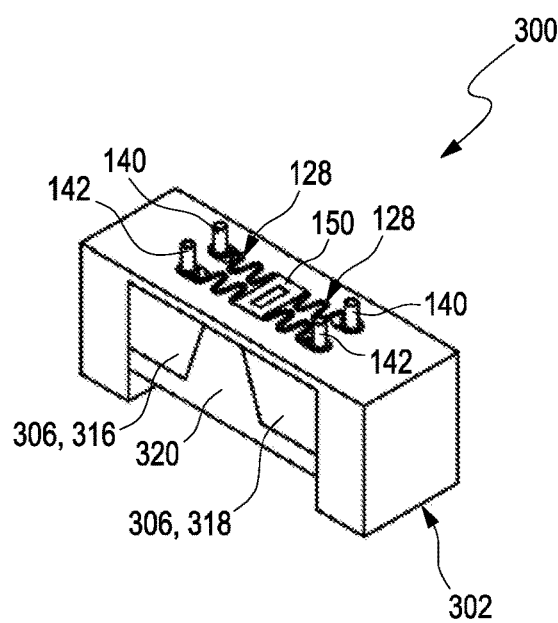

Hereinafter, a method for manufacturing the actuator assembly 100 according to the tenth embodiment will be described with reference to the apparatus 300. As shown in FIG. 6A, the method comprises providing at least one fixing member 140, 142. With the tenth embodiment, four fixing members 140, 142 in total are provided. The fixing members 140, 142, are rivets such as hollow rivets. Onto each of the holding members 312, one of the fixing members 140, 142 is disposed.

As shown in FIG. 6B, subsequently, the actuators 128 connected to one another by means of the intermediate member 150 are provided. The actuators 128 are disposed onto the holding members 312 such that with each actuator 128 the first fixing member 140 is inserted through the first actuator through hole 134 and the second fixing member 142 is inserted through the second actuator through hole 136.

As shown in FIG. 6C, subsequently, the lifting device 320 raises and moves between the base portions 316, 318. Thereby, the base portions 316, 318 move laterally outwards and away from one another. Thus, also the groups 308, 310 of holding members 312 move laterally outwards and away from one another. Thereby, the actuators 128 are stretched as the holding members 312 pull at the first and second ends 130, 132 thereof.

FIG. 6D show the lifting device (also referred to as a "lifter") 320 raised to its uppermost position and the base portions 316, 318 moved laterally outwards to its outermost positions. Thereby the actuators 128 are biased against one another.

As shown in FIG. 6E, the method further comprises providing the substrate 102. The substrate 102 is disposed onto the holding members 312 such that the first circuit paths 110 and the second circuit paths 112 face away from the actuators 128. More particularly, the substrate 102 and the actuators 128 are arranged such that the first actuator through holes 134, the first circuit path through holes 118 and the first substrate through holes 104 overlap one another. Further, the substrate 102 and the actuators 128 are arranged such that the second actuator through holes 136, the second circuit path through holes 124 and the second substrate through holes 106 overlap one another. Thus, for each actuator 128, the first fixing member 140 is inserted through the first actuator through hole 134, the first circuit path through hole 118 and the first substrate through hole 104. Further, for each actuator, the second fixing member 142 is inserted through the second actuator through hole 136, the second circuit path through hole 124 and the second substrate through hole 106.

Subsequently, the upper part 304 and the lower part 302 are moved towards one another such that the pressing members 314 engage the holding members 312. Thereby, the fixing members 140, 142 are pressed and deformed so as to permanently fix the actuators 128 to the substrate 102 and the first circuit paths 110 at least at the first ends 130 by means of the first fixing members 140 and to permanently fix the actuators 128 to the substrate 102 and the second circuit paths 112 at the second ends 132 by means of the second fixing members 142.

FIG. 6F shows a lower perspective view of the actuator assembly 100 manufactured with this method. FIG. 6G shows a top perspective view of the actuator assembly 100 manufactured with this method. As shown in FIGS. 6F and 6G, finally the actuator assembly 100 is removed from the apparatus 300. Particularly, with this apparatus 300, the actuators 128 are concertedly permanently fixed to the substrate 102, the first circuit paths 110 and the second circuit paths 112 at first ends 130 and at the second ends 132 by means of the fixing members 140, 142. Further, the actuators 128 are electrically connected to the first circuit paths 110 and the second circuit paths 112 at first ends 130 and at the second ends 132 by means of the fixing members 140, 142.

Figure 7:
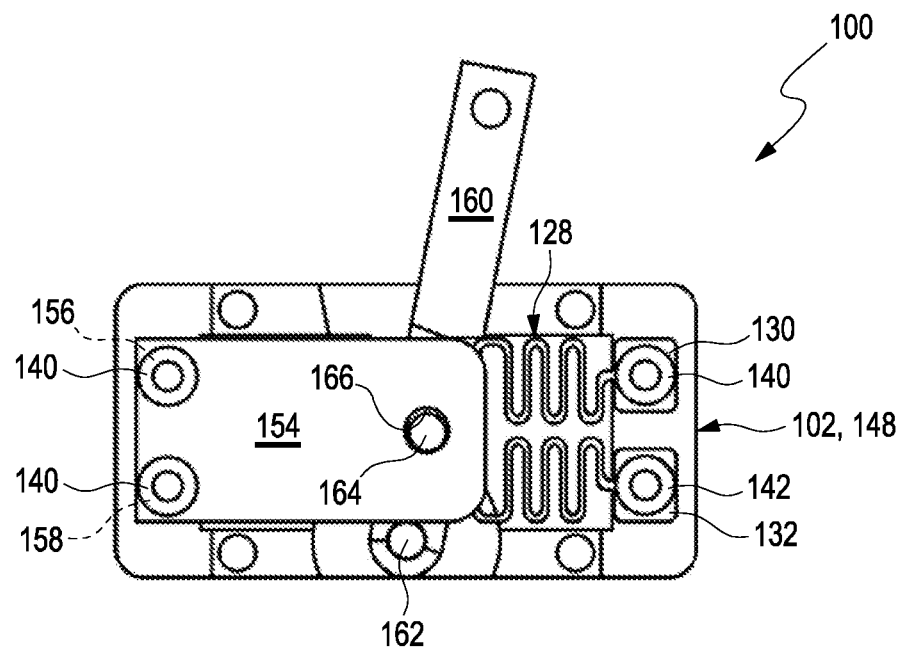
FIG. 7A shows a plan view of an actuator assembly according to an eleventh embodiment.
FIG. 7B shows a perspective view of the actuator assembly according to the eleventh embodiment.
Figure 7:
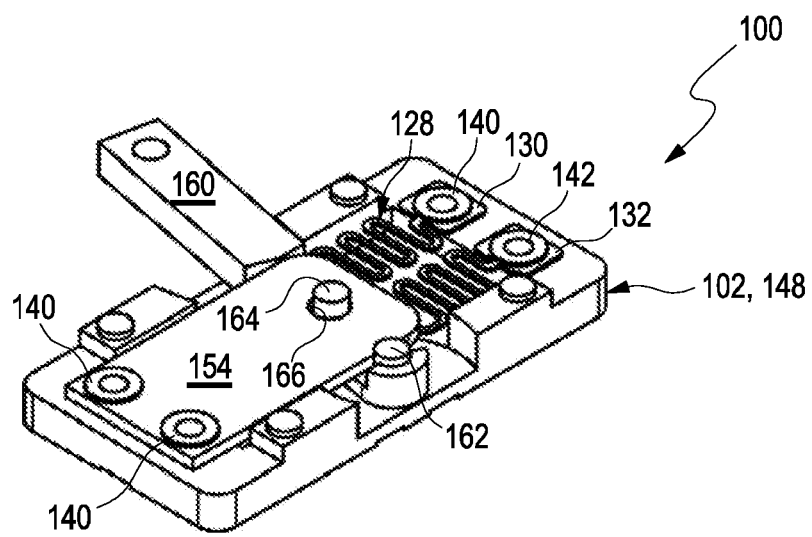

FIG. 7A shows a plan view of an actuator assembly 100 according to an eleventh embodiment. FIG. 7B shows a perspective view of the actuator assembly 100 according to the eleventh embodiment. Hereinafter, only the differences from the actuator assembly 100 according to the tenth embodiment will be explained and like or comparable constructional members are indicated by like reference numerals. With the actuator assembly 100 according to the eleventh embodiment, the substrate 102 is a casing or casing portion. Such a casing may comprise at least one circuit path, which is preferably formed by selective surface metallization. The actuator assembly 100 according to the eleventh embodiment further comprises an elastic resetting member 154 configured to reset the actuator 128 into its original (deflected/deformed) position. The elastic resetting member 154 is permanently fixed to the substrate 102 by means of at least one fixing member 140, particularly by means of at least one rivet. For this purpose, the substrate 102 comprises a third substrate through hole 156 and a fourth substrate through hole 158 through which the fixing member 140 may be inserted. As the elastic resetting member 154 is a passive structure, it does not have to be connected to any circuit paths. The resetting member 154 may be a thin elastomeric foil. Alternatively, the resetting member 154 may be a planar spring fabricated preferably from spring steel or a beryllium copper alloy. The first and second ends 130, 132 of the actuator 128 are connected to one another by means of a meandering actuating section 138. Further, the actuator 128 is connected to the elastic resetting member 154. The first circuit path 110 and the second circuit path 112 are located on the lower side of the substrate 102 which is opposite to the side of the location of the actuator 128. The actuator assembly 100 according to the eleventh embodiment further comprises a lever 160. The actuator 128 is configured to move the lever 160. Particularly, the actuator 128 is configured to pivot the lever 160 around a pivotal axis 162. For this purpose, the actuator 128 comprises a pin 164 engaging an opening or slot 166 of the elastic resetting member 154 spaced apart from the pivotal axis 162. The resetting member 154 and the actuator 128 are biased against one another. Basically, the biasing and mounting of the resetting member 154 and the actuator 128 may be made and carried out concertedly with an apparatus similar to the one shown in FIGS. 6A to 6G.

Concerning all embodiments described herein, the apparatus may be heated to heat the actuators above its shape change temperature Af so as to activate the shape memory effect. Thus, deformed actuators may retract on their own to smoothen and are easier to be handled. It is explicitly stated that only one end of the actuators may be permanently fixed in the manner described. The circuit paths may also be used to supply heat from a heating source and/or to measure the electrical resistance of the actuator. The actuators do not need to be planar. Rather, coil springs made of a shape memory material or (partially or entirely) flattened wires having through holes may be used for the fixation process.

The actuator assemblies described herein may be part of a valve such as a gate valve or a seat valve comprising a valve member, a valve seat, and an actuator assembly according to the embodiments described herein. In this case, the actuator is configured to selectively move the valve member to the valve seat or away from the valve seat so as to close or open the valve as will be described in further detail below.

FIGS. 8A to 8G show different views of two exemplary valves 400, 500.

Particularly, FIGS. 8A to 8G show how to realize seat valves 400, 500 with normally open (NO) and normally closed (NC) functionality based on the present disclosure. As the NO valve 400 and the NC valve 500 are similar in function, both will be described together and the differences from one another are described in further detail.

Figure 8:
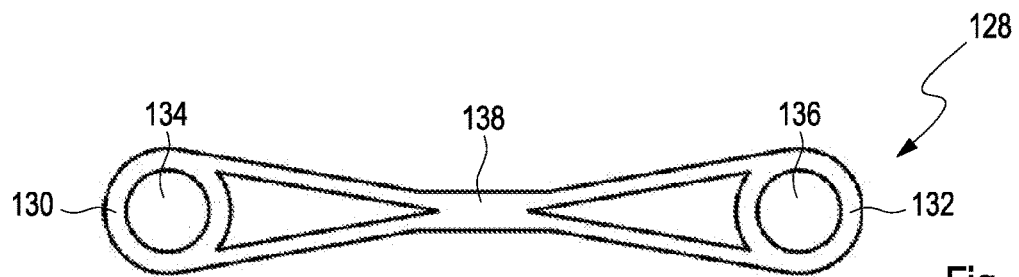
FIGS. 8A to 8G show different views of two exemplary valves.
Figure 8:
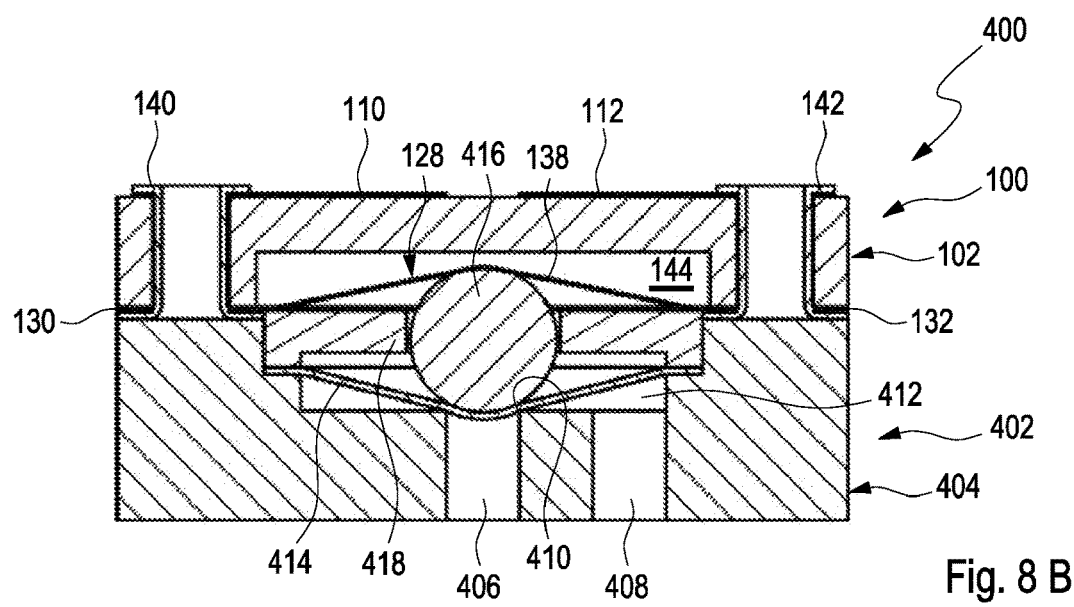
Figure 8:
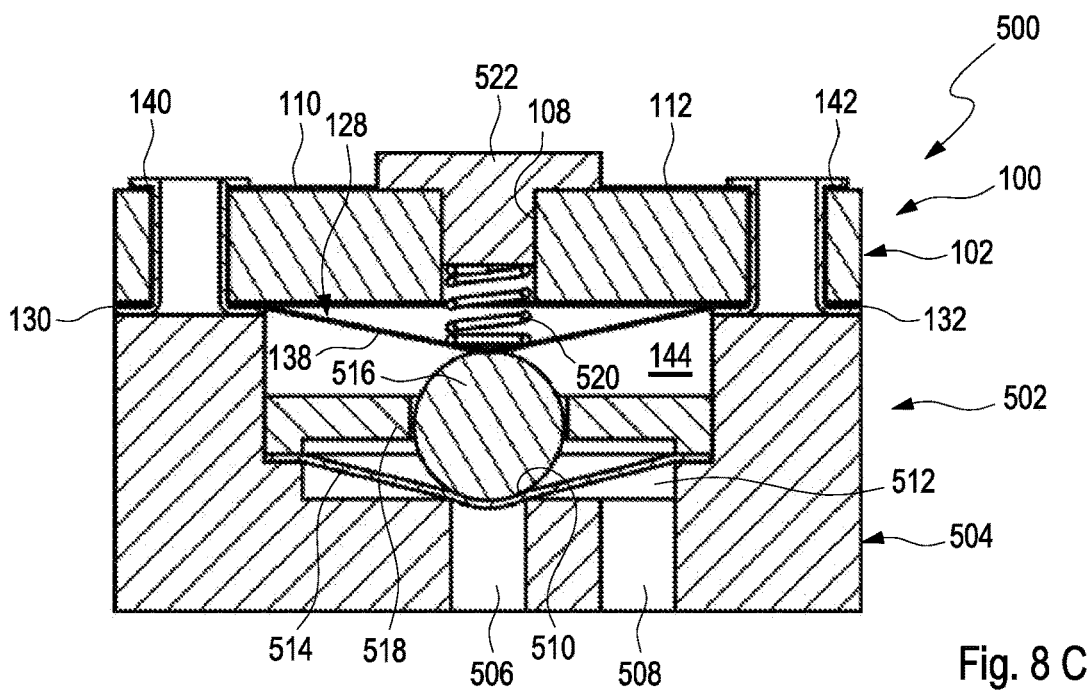
Figure 8:
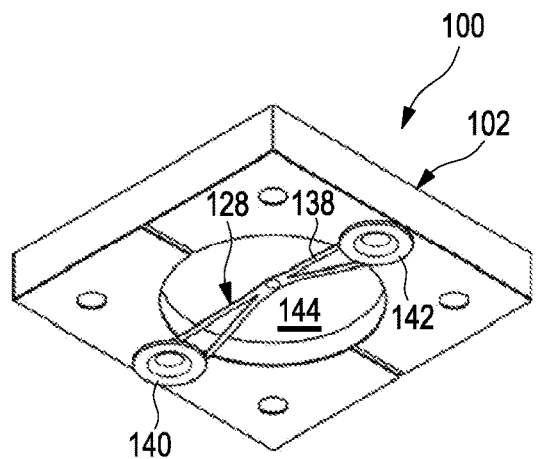
Figure 8:
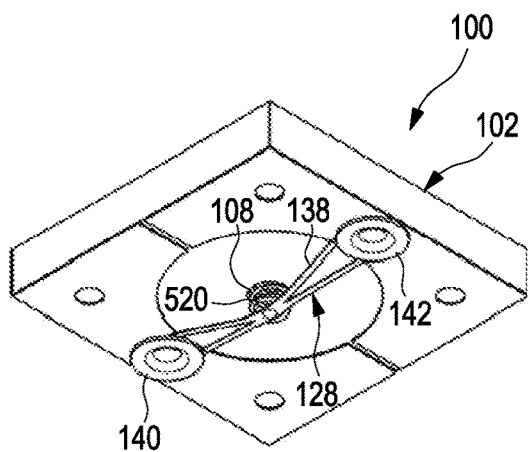
Figure 8:
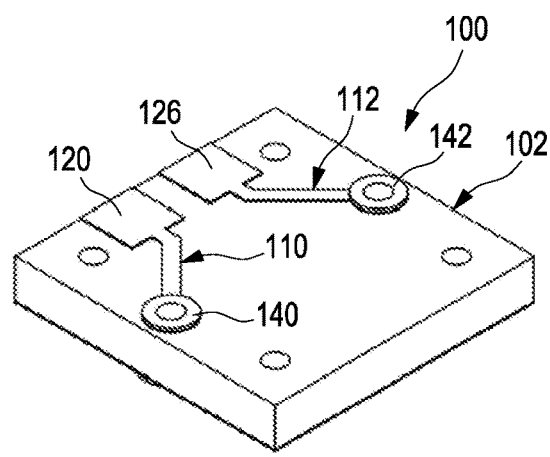
Figure 8:
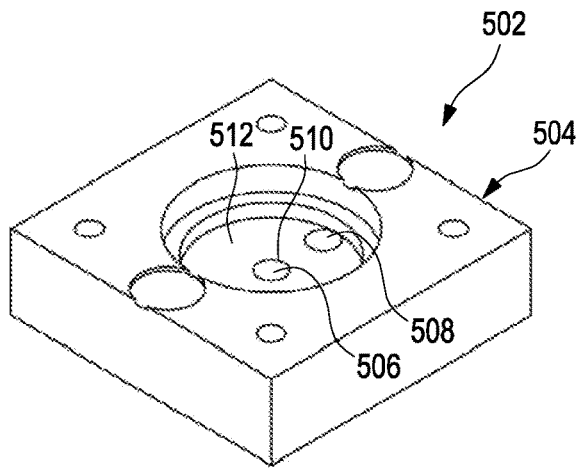

FIG. 8A shows the actuator 128 of the actuator assembly of FIG. 1 in top view. FIG. 8B shows a cross-section of a normally open (NO) valve 400. FIG. 8C shows a cross-section of a normally closed (NC) valve 500. FIG. 8D shows a perspective bottom view of the actuation part of the NO valve 400. FIG. 8E shows a perspective bottom view of the actuation part of the NC valve 500. FIG. 8F shows a perspective top view of the actuation part of the NO valve 400. FIG. 8G shows a perspective top view of the fluidic part of the NO valve 500 with open valve chamber.

A seat valve 400, 500 may be realized by combining an actuator assembly 100 based on or similar to the description of FIG. 1 with a fluidic part 402, 502. These two parts may be connected, e.g., by press-fitting, fixing pins, screws, glue, snap-in mechanisms or any other connection technology. The fluidic part 402, 502 as can be best seen in FIGS. 8B, 8C, 8G comprises a housing part 404, 504 with at least one inlet 406, 506 and at least one outlet 408, 508. The inlet 406, 506 ends or terminates in a valve seat 410, 510 within a valve chamber 412, 512. The valve chamber 412, 512 is closed above by a membrane 414, 514 fixed on the housing part 404, 504. Above the membrane 414, 514, a valve member 416, 516 such as a plunger or sphere is guided and aligned centrically above the valve seat 410, 510 by a valve member guide 418, 518.

The actuator assembly 100 for the NO valve 400 shown in FIGS. 8B, 8D, 8F comprises a substrate 102 having an actuator 128 mounted on the bottom side thereof and which substrate 102 contains a cavity 144 allowing the actuator 128 to be deflected out-of-plain into the cavity 144. The actuator assembly 100 is assembled on top of the fluidic part 402, 502 in such a way, that the valve member 416 deflects the actuator 128 out-of-plane into the cavity 144. When the actuator 128 is unheated, positive pressure of the fluid on the inlet 406 may press the membrane 414 with the valve member 416 on top away from the valve seat 410 and thus pass through towards the outlet 408. By this, the actuator 128 is additionally deflected into the cavity 144. When heated, the actuator 128 develops a force pressing the valve member 416 down onto the valve seat 410. The membrane 414 in between hinders the fluid from leaving the valve chamber 412 and getting into contact to the actuator 128.

The actuator assembly for the NC valve 500 shown in FIGS. 8C, 8E, 8G comprises a substrate 102 having an actuator 128 mounted on the bottom side thereof. It has to be noted that FIG. 8G only shows the housing part 504 of the fluidic part 502 for reasons of clarity. The substrate 102 comprises an opening 108 for inserting a reset spring 520 such as a compressive helical spring in the center of the actuation section 138. Needless to say, other types of reset springs could be used as an alternative, e.g., planar springs, preferably made from spring steel or a copper beryllium alloy. The spring 520 is inserted after fixing the actuator 128 on the substrate 102 and the opening 108 is closed by a cap 522, a screw or a similar structure. Thus, the actuator 128 is deflected out-of-plain away from the substrate 102. The actuator assembly 100 is assembled on top of the fluidic part 502 in such a way that the reset spring 520 with the cold actuator 128 below presses the valve member 512 onto the membrane 514 and the valve seat 510, respectively. When the actuator 128 is unheated, the force of the reset spring 520 holds the valve seat 510 closed against a positive pressure of the fluid on the inlet 506. When heated, the actuator 128 develops a force pulling the reset spring 520 up and compressing it into the reset spring opening 108. Thus, the force of the valve member 512 in the valve seat 510 is removed and fluid is free to pass through towards the outlet 508.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS 100 actuator assembly
102 substrate
104 first substrate through hole
106 second substrate through hole
108 opening
110 first circuit path
112 second circuit path
114 top side
116 first support surface
118 first circuit path through hole
120 first contact pad
122 second support surface
124 second circuit path through hole
126 second contact pad
128 actuator
130 first end
132 second end
134 first actuator through hole
136 second actuator through hole
138 actuating section
140 first fixing member
142 second fixing member
144 cavity
146 lower side
148 casing
150 intermediate member
152 orifice
154 resetting member
156 third substrate through hole
158 fourth substrate through hole
160 lever
162 pivotal axis
164 pin
166 slot
200 apparatus
202 lower part
204 upper part
206 base
208 holding member
210 pressing member
212 spring
214 supply device
216 separating device
218 moving device
300 apparatus
302 lower part
304 upper part 306 base
308 group
310 group
312 holding member
314 pressing member
316 base portion
318 base portion
320 lifting device
400 NO valve
402 fluidic part
404 housing part
406 inlet
408 outlet
410 valve seat
412 valve chamber
414 membrane
416 valve member
418 valve member guide
500 NC valve
502 fluidic part
504 housing part
506 inlet
508 outlet
510 valve seat
512 valve chamber
514 membrane
516 valve member
518 valve member guide
520 reset spring
522 cap

What is claimed is:

1. An actuator assembly, comprising:
a substrate having a first circuit path and a second circuit path, at least one of the first and second circuit paths mounted on a first side of the substrate;
an actuator made at least partially of a shape memory material and having first and second ends;
wherein the first end comprises a first actuator through hole and the first circuit path comprises a first support surface defining a first circuit path through hole, wherein the substrate comprises a first substrate through hole, wherein the first actuator through hole, the first circuit path through hole and the first substrate through hole overlap one another, wherein a first fastener extends through the first actuator through hole, the first circuit path through hole and the first substrate through hole, wherein the actuator is permanently fixed to the substrate and the first circuit path at least at the first end by the first fastener; and
wherein the second end comprises a second actuator through hole and the second circuit path comprises a second support surface defining a second circuit path through hole, wherein the substrate comprises a second substrate through hole, wherein the second actuator through hole, the second circuit path through hole and the second substrate through hole overlap one another, wherein a second fastener extends through the second actuator through hole, the second circuit path through hole and the second substrate through hole, wherein the actuator is permanently fixed to the substrate and the second circuit path at the second end by the second fastener.

2. The actuator assembly of claim 1, wherein the shape memory material comprises one or more of NiTi or NiTiCu.

3. The actuator assembly according to claim 1, wherein at least the first fastener is a rivet.

4. The actuator assembly of claim 3, wherein the rivet comprises at least one of (i) a hollow rivet, (ii) an electrically conductive material and (iii) an electrically conductive surface coating.

5. The actuator assembly according to claim 1, wherein the actuator is electrically connected to the first circuit path by the first fastener and wherein one or both of the first fastener and the first circuit path is made from an electrically conductive material.

6. The actuator assembly according to claim 1, wherein (i) the actuator and the first and second circuit paths are located on the first side of the substrate or (ii) the first and second circuit paths are located on the first side of the substrate and the actuator is located on a second side of the substrate opposing the first side of the substrate.

7. The actuator assembly according to claim 1, wherein the actuator comprises two actuators biased in opposite directions.

8. The actuator assembly according to claim 1, wherein the substrate comprises two substrates and the actuator is located between the two substrates.

9. The actuator assembly according to claim 1, wherein the substrate comprises two substrates and at least one of the two substrates is a casing.

10. The actuator assembly according to claim 1, wherein the substrate is one or more of (i) a circuit board member, (ii) flexible, and (iii) formed as a casing.

11. The actuator assembly according to claim 10, wherein the substrate is formed by selective surface metallization.

12. The actuator assembly according to claim 1, further comprising an elastic resetting member configured to reset the actuator into an original position.

13. The actuator assembly according to claim 12, wherein the elastic resetting member is permanently fixed to the substrate by one or both of the first and second fasteners.

14. The actuator assembly according to claim 12, further comprising a lever, wherein the actuator is configured to move the lever.

15. The actuator assembly according to claim 1, wherein the actuator is formed substantially planar at the first end and second end and the first end and the second end of the actuator are connected to one another by an actuating section.

16. The actuator assembly according to claim 15, wherein the actuating section is straight or curved.

17. The actuator assembly according to claim 16, wherein the actuating section is meandering or Kirigami-like.

18. An actuator assembly, comprising:
a substrate having a substrate through hole;
a circuit path mounted on an outer side of the substrate, the circuit path having a support surface that defines a circuit path through hole;
an actuator made at least partially of a shape memory material and having first and second ends, the actuator having an actuator through hole at the first end; and
a fastener;
wherein the fastener extends through the actuator through hole, the circuit path through hole and the substrate through hole, wherein the actuator is permanently fixed to the substrate and the circuit path at the first end by the fastener.

19. The actuator assembly of claim 18, further comprising:
a second substrate through hole;
a second circuit path having a second support surface that defines a second circuit path through hole; and
a second fastener.

20. The actuator assembly of claim 19, wherein the second fastener extends through a second actuator through hole at the second end of the actuator, and the second fastener extends through the second circuit path through hole and the second substrate through hole, wherein the actuator is permanently fixed to the substrate and the second circuit path at the second end by the second fastener.

21. The actuator assembly of claim 19, wherein the second fastener extends through an actuator through hole at an end of a second actuator, and the second fastener extends through the second substrate through hole and the second circuit path through hole, wherein the second actuator is fixed to the substrate and second circuit path by the second fastener.

22. The actuator assembly of claim 18, wherein the fastener extends through an actuator through hole at an end of a second actuator.

23. An apparatus for manufacturing an actuator assembly according to claim 18, comprising:
a lower part having a base with two holders configured for holding the substrate, the actuator and the fastener in a predetermined position relative to one another;
an upper part having two pressers, wherein the upper part and the lower part are moveable towards one another such that the pressers engage the holders, wherein an engagement of the pressers and the holders is configured to press and deform the fastener such that the actuator is permanently fixed to the substrate and the circuit path at least at the first end.

24. The apparatus according to claim 23, wherein:
the holders comprise individually moveable groups of holders, each group having at least one holder;
the pressers comprise groups of pressers; and
the upper part and the lower part are moveable towards one another such that the pressers engage respective holders.

25. The apparatus according to claim 24, wherein the groups of holders are moveable relative to one another to bias the first end and second end of one or more actuators in opposite directions.

26. The apparatus according to claim 23, further comprising one or more of: (i) a supply configured to supply a plurality of actuators connected to one another to the lower part, (ii) a separator configured to separate actuators, and (iii) a mover configured to move the lower part towards a first position in which a separated actuator is disposable on the holders and a second position in which the lower part is engageable by the upper part.

27. A valve, comprising:
a valve member;
a valve seat; and
an actuator assembly according to 18, wherein the actuator is configured to selectively move the valve member to the valve seat or away from the valve seat to thereby close or open the valve.

28. The valve of claim 27, wherein the valve comprises a gate valve or a seat valve.

29. The actuator assembly according to claim 5, wherein the actuator has an electrically conducted surface coating which is noncorrosive.

30. The actuator assembly according to claim 7, wherein the two actuators are connected to one another by an intermediate member.

31. An apparatus for manufacturing an actuator assembly according to claim 18, comprising holders that are moveable relative to one another to bias the first end and second end of the actuator in opposite directions before the actuator is secured to the substrate.

* * * * *